US008347267B2

(12) United States Patent
Givoni et al.

(10) Patent No.: US 8,347,267 B2
(45) Date of Patent: *Jan. 1, 2013

(54) AUTOMATED SOFTWARE TESTING AND VALIDATION SYSTEM

(75) Inventors: Ethan Givoni, Framingham, MA (US); Naomi Ravitz, Brooklyn, NY (US); Ziv Ravitz, Brooklyn, NY (US); Thang Quoc Nguyen, Placentia, CA (US); Thieu Nguyen, Santa Ana, CA (US)

(73) Assignee: SmarteSoft, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/045,989

(22) Filed: Mar. 11, 2011

(65) Prior Publication Data

US 2011/0202901 A1    Aug. 18, 2011

Related U.S. Application Data

(63) Continuation of application No. 11/448,150, filed on Jun. 6, 2006, now Pat. No. 7,917,895, which is a continuation-in-part of application No. 10/208,649, filed on Jul. 29, 2002, now Pat. No. 7,093,238.

(60) Provisional application No. 60/308,453, filed on Jul. 27, 2001, provisional application No. 60/399,586, filed on Jul. 29, 2002.

(51) Int. Cl.
G06F 9/44       (2006.01)
G06F 11/00      (2006.01)

(52) U.S. Cl. .......... 717/124; 717/125; 717/131; 714/38; 714/703

(58) Field of Classification Search ........................ None
See application file for complete search history.

(56) References Cited

U.S. PATENT DOCUMENTS

| 5,414,836 | A |   | 5/1995 | Baer et al. |
| 5,600,789 | A |   | 2/1997 | Parker et al. |
| 5,627,979 | A |   | 5/1997 | Chang et al. |
| 5,742,754 | A | * | 4/1998 | Tse ............................ 714/38.14 |
| 5,758,061 | A |   | 5/1998 | Plum |
| 5,781,720 | A |   | 7/1998 | Parker et al. |

(Continued)

OTHER PUBLICATIONS

Libor Vanek; Automated test methods; Sep. 2010; [online]; pp. 1-24; Retrieved online on Sep. 18, 2012. Retrieved from the Internet: <URL: http://www.fit.vutbr.cz/study/courses/TJD/public/0910TJD-Vanek.pdf>.*

(Continued)

*Primary Examiner* — Thuy Dao
*Assistant Examiner* — Hanh T Bui
(74) *Attorney, Agent, or Firm* — The Culbertson Group, P.C.

(57) ABSTRACT

An automated software testing system allows automated test script generation with fully parameterized scripts, execution, and result correlation. A software Application Under Test (AUT) includes a process having Graphical User Interface (GUI) windows, objects and data elements. A test thread tree is generated corresponding to these windows, objects and data elements. A data structure is generated to enumerate test cases indicative of the windows, objects and data elements. Also generated is a parameterized script implementing the test cases and having string values instead of hard-coded data. A global change manager automates modifying in the data structure, data object attributes across multiple scripts. A Scenario view or data generation member generates Test Descriptions, automatically documenting the test cases. The script is executed to apply each of the test cases to the AUT and receive responses.

20 Claims, 20 Drawing Sheets

U.S. PATENT DOCUMENTS

| | | | |
|---|---|---|---|
| 5,787,254 | A | 7/1998 | Maddalozzo, Jr. et al. |
| 5,812,780 | A | 9/1998 | Chen et al. |
| 5,819,066 | A | 10/1998 | Bromberg et al. |
| 5,905,856 | A | 5/1999 | Ottensooser |
| 6,002,871 | A | 12/1999 | Duggan et al. |
| 6,006,260 | A | 12/1999 | Barrick, Jr. et al. |
| 6,067,639 | A * | 5/2000 | Rodrigues et al. ......... 714/38.11 |
| 6,069,630 | A | 5/2000 | Lisle et al. |
| 6,138,112 | A | 10/2000 | Slutz |
| 6,138,157 | A | 10/2000 | Welter et al. |
| 6,275,976 | B1 | 8/2001 | Scandura |
| 6,349,393 | B1 | 2/2002 | Cox |
| 6,360,332 | B1 * | 3/2002 | Weinberg et al. ............... 714/4.1 |
| 6,505,342 | B1 | 1/2003 | Hartmann et al. |
| 6,662,312 | B1 * | 12/2003 | Keller et al. ............... 714/38.14 |
| 6,701,514 | B1 * | 3/2004 | Haswell et al. ............... 717/124 |
| 6,725,399 | B1 | 4/2004 | Bowman |
| 6,775,824 | B1 * | 8/2004 | Osborne et al. ............... 714/703 |
| 6,810,364 | B2 | 10/2004 | Conan et al. |
| 6,898,784 | B1 | 5/2005 | Kossatchev et al. |
| 6,907,546 | B1 | 6/2005 | Haswell et al. |
| 6,944,848 | B2 * | 9/2005 | Hartman et al. ............... 717/124 |
| 6,948,154 | B1 | 9/2005 | Rothermel et al. |
| 6,993,747 | B1 * | 1/2006 | Friedman ...................... 717/124 |
| 7,007,207 | B2 * | 2/2006 | Emek et al. ................... 714/703 |
| 7,043,679 | B1 * | 5/2006 | Keltcher et al. ............... 714/703 |
| 7,290,245 | B2 | 10/2007 | Skjolsvold |
| 7,543,278 | B2 * | 6/2009 | Klementiev ................... 717/125 |
| 7,624,380 | B2 * | 11/2009 | Okada ............................ 717/131 |
| 7,861,226 | B1 * | 12/2010 | Episkopos et al. ............. 717/124 |
| 7,886,272 | B1 * | 2/2011 | Episkopos et al. ............. 717/124 |
| 7,913,230 | B2 * | 3/2011 | Vikutan ........................ 717/124 |
| 8,032,863 | B2 * | 10/2011 | Kolawa et al. ................ 717/131 |
| 2001/0011370 | A1 * | 8/2001 | Gunter et al. ..................... 717/4 |
| 2002/0087950 | A1 * | 7/2002 | Brodeur et al. ................ 717/124 |
| 2003/0055836 | A1 | 3/2003 | Dubovsky |
| 2003/0084429 | A1 * | 5/2003 | Schaefer ....................... 717/125 |

OTHER PUBLICATIONS

Alistair Sutcliffe and Andreas Gregoriades; Validating Funtional System Requirements with Scenarios; 2002; [online]; pp. 1-8; Retrieved online on Sep. 18, 2012. Retrieved from the Internet: <UR: http://ieeexplore.ieee.org/stamp/stamp.jsp?tp=&arnumber=1048521>.*

Ernest Page et al.; A Case Studay of Verification, Validation, and Accreditation for Advanced Distributed Simulation; 1997; [online]; pp. 393-424; Retrieved online on Sep. 18, 2012. Retrieved from the Internet: <URL: http://delivery.acm.org/10.1145/260000/259375/p393-page.pdf?>.*

* cited by examiner

FIG. 5

```
//###############################################
//###   SCRIPT VIEW
//###############################################

For (num loop=0; loop < ROWS_NUMBER; loop++)   ─── 76
{
//###############################################
//###   Additional User Code Section 1
//###############################################

//###############################################                    }─78
//###   End Additional User Code Section 1
//###############################################

//###############################################
   //###   object name - "Deposit Amount:_0" in "Manage Accounts"
   //###############################################
   If(GRID_DATA[0,loop] != "")
   {                                                                 }─80 act_on_object(GRID_COLUMNS[0,0].GRID_COLUMNS[1,0].GRID_COLUMNS[2,0]
GRID_DATA[0,loop]);

//###############################################
   //###   Additional User Code For Object - "Deposit Amount:_0" in "Manage Accounts"
   //###############################################

//###############################################                 }─82
   //###   End User Code For Object - "Deposit Amount:_0" in "Manage Accounts"
   //###############################################

}

//###############################################
   //###   object name - "Account Type:_0" in "Manage Accounts"
   //###############################################
   If(GRID_DATA[0,loop] != "")
   {                                                                 }─84 act_on_object(GRID_COLUMNS[0,1].GRID_COLUMNS[1,1].GRID_COLUMNS[2,1]
GRID_DATA[0,loop]);
```

Fig. 6c

```
          92
     ⌐ 1,7/20/2002,12:33:58.60,Pass,,Update - "loop",0,0,1,20023,
     | 1,7/20/2002,12:33:58.60,Pass,SubString,String - SubString – "1000" ,Pass,104,1,20008,
     | 1,7/20/2002,12:33:58.170,Pass,General Function,Sent By The Tester,.1000 . _,0,1,20010,
     | 1,7/20/2002,12:33:58.170,Pass,DepositAmnt:,SetText - "1000 2",Pass,123,1,20006,
     | 1,7/20/2002,12:33:58.280,Pass,SubString,String - SubString - "Random",Pass,103,1,20008,
     | 1,7/20/2002,12:33:58.390,Pass,General Function,Sent By The Tester,Random,0,1,20010,
     | 1,7/20/2002, 12:33:58.390,Pass,Random,Pick Item - "Random",Pass,196,1,20036,
     | 1,7/20/2002,12:33:58.610,Pass,AcctTyp:_0,Info - "Value",Pass,104,1,20003,           101a⌐
101 ⌡ 1,7/20/2002,12:33:58.660,Pass,General Function,Sent By The Tester,Random Selection Value:(Sav
     | ings o) 0,1,20010,
     | 1,7/20/2002,12:33:58.720,Pass,SubString,String - SubString - "Random",Pass,103,1,20008,
     | 1,7/20/2002,12:33:58.770,Pass,General Function,Sent By The Tester,Random,0,1,20010,
     | 1,7/20/2002,12:33:58.770,Pass,Random,Pick Item - "Random",Pass,195,1,20036,
     | 1,7/20/2002,12:33:58.990,Pass,AcctLst,Info - "Value",Pass,106,1,20003,
     | 1,7/20/2002,12:33:59.100,Pass,General Function,Sent By The Tester,Random Selection
     | Value:(100012)0,1,20010,  ⌐101b
     ⌊ 1,7/20/2002,12.33.59.100,Pass,,Update - "loop",1,0,1,20023,  ⌐102a
     ⌐ 2,7/20/2002,12:33:59.100,Pass,SubString,String - SubString -|"2000", Pass,101,1,20008,
     | 2,7/20/2002,12:33:59.210,Pass,General Function,Sent By The|Tester,12/12/02,0,1,20010,
     | 2,7/20/2002,12:33:59.210,Pass,DepositAmnt:,SetText -("2000 "),Pass,108,1,20006,
     | 2,7/20/2002,12:33:59.320,Pass,SubString,String - SubString – "Saving",Pass,103,1,20008,
102 ⌡ 2,7/20/2002,12:33:59.430,Pass,General Function,Sent By The Tester, Saving0,1,20010,
     | 2,7/20/2002,12:33:59.430,Pass,(Saving)Pick Item - "Saving",Pass,400,1,20036, ⌐102b
     | 2,7/20/2002,12:33:59.870,Pass,SubString,String - SubString - "110123",Pass,103,1,20008,
     | 2,7/20/2002,12:33:59.930,Pass,General Function,Sent By The Tester,1101220,1,20010,
     | 2,7/20/2002,12:33:59.930,Pass,(110123)Pick Item - "110123",Pass,196,1,20036, ⌐102c
     ⌊ 2,7/20/2002,12:34:00.150,Pass,,Update - "loop",2,0,1,20023,
     ⌐ 3,7/20/2002,12:34:00.150,Pass,SubString,String - SubString - " 3000 ",Pass,101,1,20008,
     | 3,7/20/2002,12:34:00.260,Pass,General Function,Sent By The Tester,3000 ,1,20010,
     | 3,7/20/2002,12:34:00.260,Pass,DepositAmt:,SetText - "3000 ",Pass,108,1,20006,
     | 3,7/20/2002,12:34:00.370,Pass,SubString,String - SubString - " CD s",Pass,104,1,20008,
     | 3,7/20/2002,12:34:00.480,Pass,General Function,Sent By The Tester, CD ,0,1,20010,
103 ⌡ 3,7/20/2002,12:34:00.480,Pass,CD Pick Item - "CD s",Pass,207,1,20036,
     | 3,7/20/2002,12:34:00.700,Pass,SubString,String - SubString - "177656",Pass,104,1,20008,
     | 3,7/20/2002,12:34:00.810,Pass,General Function,Sent By The Tester,177656,0,1,20010,
     | 3,7/20/2002,12:34:00.810,Pass,177656,Pick Item - "177656",Pass,197,1,20036,
     ⌊ 3,7/20/2002,12:34:01.30,Pass,,Update - "loop",3,0,1,20023,
     ⌐ 4,7/20/2002,12:34:01.30,Pass,SubString,String - SubString - " 4000 ",Pass,100,1,20008,
     | 4,7/20/2002,12:34:01.140,Pass,General Function,Sent By The Tester,4000 ,0,1,20010,
     | 4,7/20/2002,12:34:01.140,Pass,DepositAmt:,SetText - "4000 ",Pass,107,1,20006,
     | 4,7/20/2002,12:34:01.240,Pass,SubString,String - SubString - " CheckinPass,103,1,20008,
104 ⌡ 4,7/20/2002,12:34:01.350,Pass,General Function, Sent By The Tester,Checkg,0,1,20010,
     | 4,7/20/2002,12:34:01.350,Pass,Checkn,Pick Item - "Checkn",Pass,452,1,20036,
     | 4,7/20/2002,12:34:01.790,Pass,SubString,String - SubString - "19000",Pass,104,1,20008,
     | 4,7/20/2002,12:34:01.900,Pass,General Function,Sent By The Tester,19000,1,20010,
     | 4,7/20/2002,12:34:01.900,Pass,19000,Pick Item - "190001",Pass,194,1,20036,
     ⌊ 4,7/20/2002,12:34:02.120,Pass,,Update - "loop",4,1,1,20023,
```

107 {
7,7/20/2002,12:34:03.830,Pass,SubString,String - SubString - "4000 ",Pass,100,1,20008,
7,7/20/2002,12:34:03.940,Pass,General Function,Sent By The Tester, 4000 ,0,1,20010,
7,7/20/2002,12:34:03.940,Pass,Date of Flight,SetText - "4000 ",Pass,108,1,20006,
7,7/20/2002,12:34:04.50,Pass,SubString,String - SubString - "CD s",Pass,103,1,20008,
7,7/20/2002,12:34:04.160,Pass,General Function,Sent By The Tester, CD s,0,1,20010,
7,7/20/2002,12:34:04.160,Pass,Paris,Pick Item - " CD ",Pass,196,1,20036,
7,7/20/2002,12:34:04.320,Pass,SubString,String - SubString - "S30000 ",Pass,103,1,20008,
7,7/20/2002,12:34:04.430,Pass,General Function,Sent By The Tester,S3000 ,0,1,20010,
7,7/20/2002,12:34:04.430,Fail,(S30000),Pick Item - "S30000 ",The requested object is not in list,16,1,20036,   ↙ 107a
7,7/20/2002,12:34:04.490,Pass,Fly To:_0,SetText - " S30000 ",Pass,3,1,20006,
7,7/20/2002,12:34:04.490,Pass,,Update - "loop",7,0,1,20023,
}

Fig. 6f

AUTOMATED SOFTWARE TESTING AND VALIDATION SYSTEM

CROSS REFERENCE TO RELATED APPLICATIONS

This application is a continuation of U.S. patent application Ser. No. 11/448,150, filed Jun. 6, 2006, now U.S. Pat. No. 7,917,895 B2, which application is a continuation-in-part of U.S. patent application Ser. No. 10/208,649, filed Jul. 29, 2002, now U.S. Pat. No. 7,093,238, which claims the benefit of U.S. Provisional Application No. 60/308,453, first named inventor E. Givoni, filed Jul. 27, 2001, and U.S. Provisional Application No. 60/399,586, first named inventor E. Givoni, filed Jul. 29, 2002. The entire teachings of the above applications are incorporated herein by reference.

FIELD OF THE INVENTION

The invention relates to automated software testing systems, and particularly to those allowing test script generation with fully parameterized testing scripts.

BACKGROUND

In a software development environment, proper testing is a significant component of the resources required to develop a market acceptable software product. Aggressive development schedules may force trimming of time, human resource, and monetary resources invested in a product. Often, testing phases are accelerated or truncated, rather than sacrificing product functionality already promised to customers, in an effort to maintain cost and ship date milestones. Accordingly, testing may be performed in an ad-hoc, unrepeatable manner. Incomplete testing leads to a product in which many customer execution scenarios have not been exercised, promoting bugs in the released product. Unrepeatable tests require redundant effort to retest upon successive releases or revisions. Such practices tend to allow deployment of a product that is prone to short revision cycles and release of bug fix "patches," which exacerbate the problem presented by unrepeatable testing.

Scripting methods are known that provide for development of test script files to emulate actual use of a software product. A test script file attempts to codify the inputs and outputs for the operation of a software product, allowing a predetermined input to be associated with an expected output. Aggregation of test script files covering a range of expected operations, along with the expected outputs, allows many test scenarios to be executed by the software product in a relatively short time, mitigating the burdens of manual input and manual determination of a correct result. One such prior art test scripting system is WinRunner™, marketed commercially by MERCURY INTERACTIVE®.

However, a large array of test scripts becomes prone to maintenance issues itself. Revisions to keep test scripts current also require substantial resources. Absence of a unified scripting approach may cause scripts developed by one tester to be unwieldy by another tester, and thus trigger duplication of effort. Incomplete or inaccurate revisions of the test scripts make it unclear whether a failure result is caused by software bugs or merely incorrect test scripts. As a result, software product testing remains an unglamourous, underestimated, and often overlooked, but necessary aspect to software product development.

SUMMARY

A system and method for automated software testing and validation allows automated test generation with a fully parameterized script, execution, and result correlation in a recreatable and readily adaptable manner. Global (automated) change of attributes of windows, object and data elements across multiple scripts and automated test case description (documentation) are provided.

More particularly, a software application under test (AUT) is identified and can include a plurality of processes; each process can have a sequence of Graphical User Interface (GUI) windows, objects and data elements. A learning module forms for the processes in the AUT, a test thread tree corresponding to the windows, objects and data elements in the process. A grid is generated from the test thread tree and enumerates test cases indicative of the windows, data elements and objects in the AUT processes. The grid enables different values for objects, data elements and windows in the AUT process, and the grid enables different types of actions for the respective objects. Also generated from the test thread tree and grid is a parameterized script indicative of each of the test cases. The script employs respective string variables for names of windows and objects. That is, in the script where prior art would have used hard coded data of the AUT process, the current invention automatically places, inserts or otherwise utilizes respective string variables. The script is operable to be executed by a test engine to apply each of the test cases to the AUT. The script can be executed in the test engine, for example, by sending each of the test cases to the AUT and receiving a test response for each test case from the AUT. A test report can then be generated, indicative of an expected response, and compared to the actual responses to provide a test result indicative of a status of pass or fail for each test case in question.

The grid includes grid entries, each corresponding to a test case. Each grid entry has column entries corresponding to each data element, object and window in the process identified by the test thread tree. The data objects (data elements, objects and windows) can be sent to the AUT according to the script by, for example, interfacing with the GUI message passing mechanism employed by the AUT and the corresponding GUI. The grid entries may be populated manually via tester input, by automated mechanisms such as from a database, or other suitable means.

As the script is executed, each data object can be provided an object value from the grid. The script can then reference the grid according to the window sequence of the GUI, and determine object values from the corresponding test case for each data object. The script can further include execution looping constructs, randomizing operations to select from a pulldown list, or combo box, and function statement interfaces to provide flow modifications such as checkpoints, external function hooks, and library operations.

A global change manager automates modifying the test thread tree attributes of multiple (or at least one) objects and windows across multiple scripts.

A Scenario view member generates, from the test thread tree and the grid, a Test Description of a test scenario in a manner that automates documentation of the test scenario based on the script.

BRIEF DESCRIPTION OF THE DRAWINGS

The foregoing and other objects, features and advantages of the system and method for automated software testing and validation will be apparent from the following more particular description of particular embodiments, as illustrated in the accompanying drawings in which like reference characters refer to the same parts throughout the different views. The drawings are not necessarily to scale, emphasis instead being placed upon illustrating the principles of the invention.

FIG. 5 shows the random operation of an object value in the grid.

FIGS. 6a-6f are an example of a test of a software application under test (AUT).

DETAILED DESCRIPTION OF PREFERRED EMBODIMENTS

Figure 1:
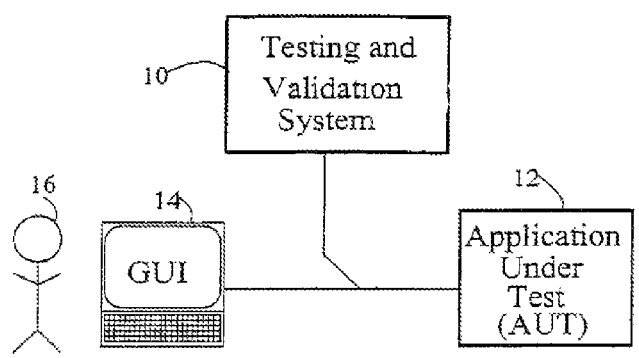
FIG. 1 is a context diagram of testing an AUT.

A particular system and method disclosed herein allows a testing and validation system to test a software application under test (AUT) by traversing user interface displays, or windows, in the Graphical User Interface (GUI) of the AUT to build a test thread tree. The test thread tree is employed to generate a grid and a script enumerating each test case, described further below, and the test is executed by interfacing with the GUI of the AUT. FIG. 1 is a context diagram for testing an AUT. Referring to FIG. 1, the testing and validation system 10 interfaces between an AUT 12 and the GUI 14 employed by a user 16 in actual operation of the AUT 12. The system 10 first builds the test cases by traversing the window sequence in the processes of the AUT 12 to obtain the expected inputs and outputs. The AUT may be in communication with the GUI 14 via a local direct connection, via a remote connection such as the Internet, or other suitable connection. By emulating the inputs and outputs between the GUI 14 and the AUT 12, the system 10 executes the generated test cases in an automated manner.

Figure 2:
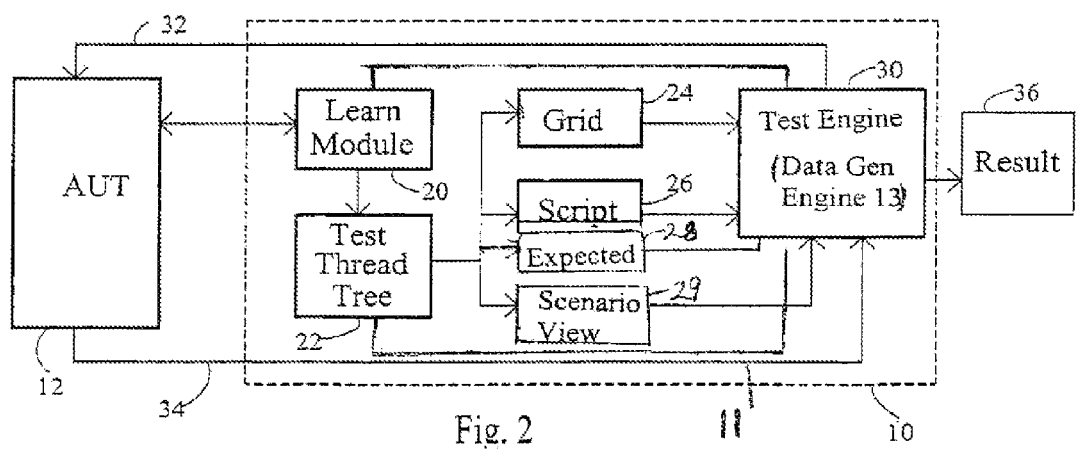
FIG. 2 is a block diagram of the automated software testing and validation system as defined herein.

FIG. 2 is a block diagram of a particular automated software testing and validation system 10 in greater detail. Referring to FIG. 2, a learn module 20 traverses the AUT 12 to determine the processes and associated window sequences. In a particular embodiment, the windows conform to a protocol such as MICROSOFT® WINDOWS®, as is known to those skilled in the art, however alternate windows platforms could be employed. Each process so identified includes a sequence of windows, and each window includes one or more data objects. A windows data object corresponds to a visible GUI field adapted to receive input, such as a point-and-click mouse button input, a free form text entry, or others described further below. The learned windows and corresponding data objects are aggregated into a test thread tree 22, which includes a sequence of all the data objects for a particular process in the AUT 12. In a particular embodiment the test thread tree 22, or object tree, for a particular process is initially learned by manually traversing the windows of a particular process by a tester to identify the windows and data objects in the process.

It should be understood that other mechanisms of building the test thread tree may be employed.

The windows and data objects in the process are learned by traversing the sequence of windows and corresponding data objects in the process under test. In such a windows platform, each window and data object has properties which may be accessed by the learn module. The properties are accessed in response to user input which defines the data objects in the test, and such properties are retrieved via the windows platform to build the test thread tree 22.

The test thread tree 22 is employed to generate a grid 24 and a script 26 for the process. For a particular process, the grid 24, script 26, and report 28 enumerate a plurality of test cases covering the process. The grid 24 includes a grid entry, or row, for each test case. Each column in the grid 24 identifies a data object from the test thread tree 22. For each column entry, an object value corresponding to the data object may be specified, as will be described further below. Further, a regression manager may be employed to aggregate a plurality of test cases. The aggregated test cases may then be executed according to a particular testing priority.

The script 26 specifies the order in which the grid 24 entries will be executed in the AUT 12. During execution, the script 26 accesses the grid 24 and specifies object values to be applied to the data objects for each test case. The script specified object values are applied, or sent, to the AUT 12 by the test engine 30, as shown by arrow 32.

There is an enumeration of expected outputs, or expected test responses 28, to be returned by the AUT 12. Correlation of the expected results 28 with the test responses 34 by the test engine 30 allows the pass or fail test result 36 to be computed for all the test cases of a process.

The generated scripts 26 are fully parameterized. The parameterization engine 11 for accomplishing this is detailed later in FIGS. 8 and 9.

In some embodiments, scenario views 29 are generated by a data generation engine (processor) 13 or similar supporting unit of the test engine 30. This and other features of the different embodiments of the invention are further discussed below.

Figure 3:
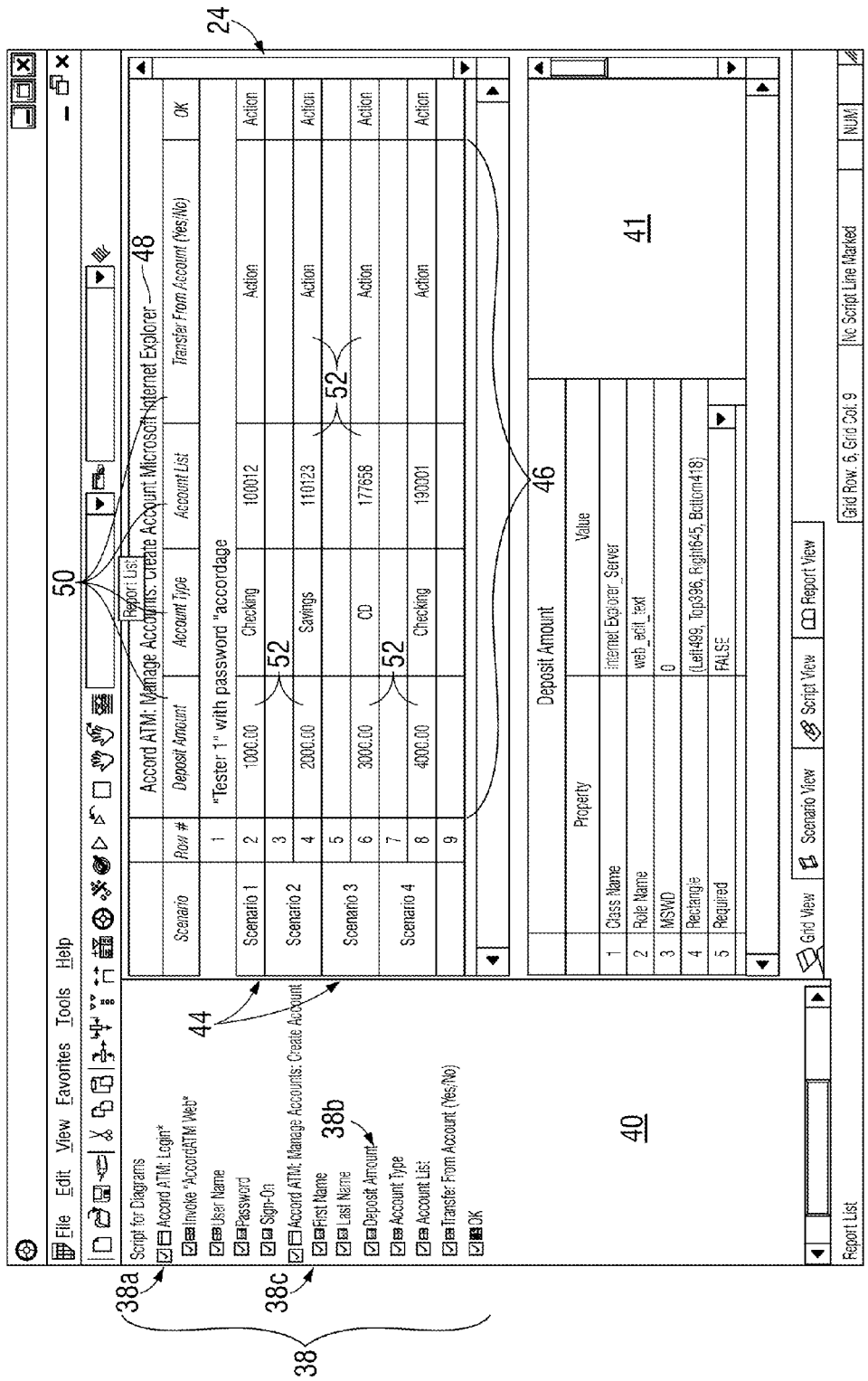
FIG. 3 is a screen diagram of a grid view.

FIG. 3 is a screen diagram of the of the grid view following learning of the test thread tree 22 (FIG. 2). Referring to FIGS. 3 and 2, a test thread window 40 displays the test thread tree 38 in a hierarchical form showing each window 38a in the order along with the child data objects 38b in includes. A test display window 41 displays the grid 24 with grid entries 44 for each test case, and columns entries 46 corresponding to each data object 38b. The grid denotes window headings 48 for each window 38a in the test thread tree, and further has object headings 50 denoting the data objects 38b in the window 38a. Object values 52 to be employed for a particular data object in a test case are indicated by the intersection of each grid row 44 and column 46, and may be null if no object value 52 is to be entered.

The grid display allows a plurality of test cases to be generated for the learned test thread tree 38. A test engineer navigates the grid 24 and provides corresponding object values 52 to be employed for a test case. Further, the test engineer may query the data object type and window type via the test thread tree 38. As each data object has a type, an appropriate range of object values is defined. Erroneous, or negative testing cases may therefore also be generated by providing an object value outside the expected range. Exemplary data object types include free form text, push button, radio button, action button, combo box, check button, menu item, page tab, item list, and tool bar. Other data object types may be employed.

Figure 4:
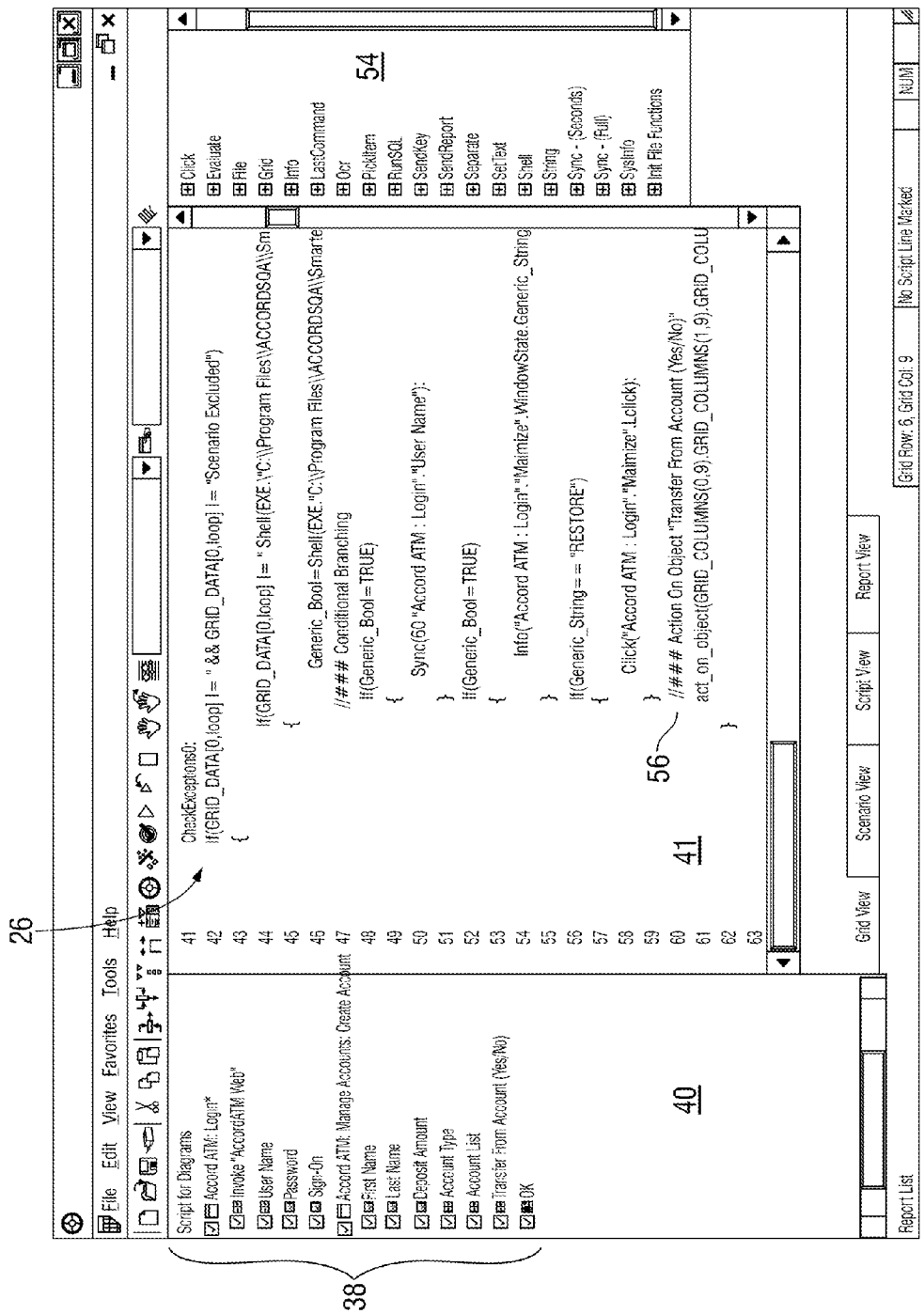
FIG. 4 is a screen diagram of a script view.

FIG. 4 is a screen diagram of a script view. Referring to FIGS. 4, 3, and 2, the test thread window 40 shows the test thread tree 38, as in FIG. 3, however the test display window 41 displays the script 26 corresponding to the grid 24. The script 26 contains the instructions to be executed by the test engine 30, and references the corresponding object values 52 from the grid 24. A statement window 54 contains additional statements, or flow modifications, which can modify the script 26 via the user code sections 56 in the script. The script will also be described in further detail below with respect to FIGS. 6c and 6d.

Figure 5:
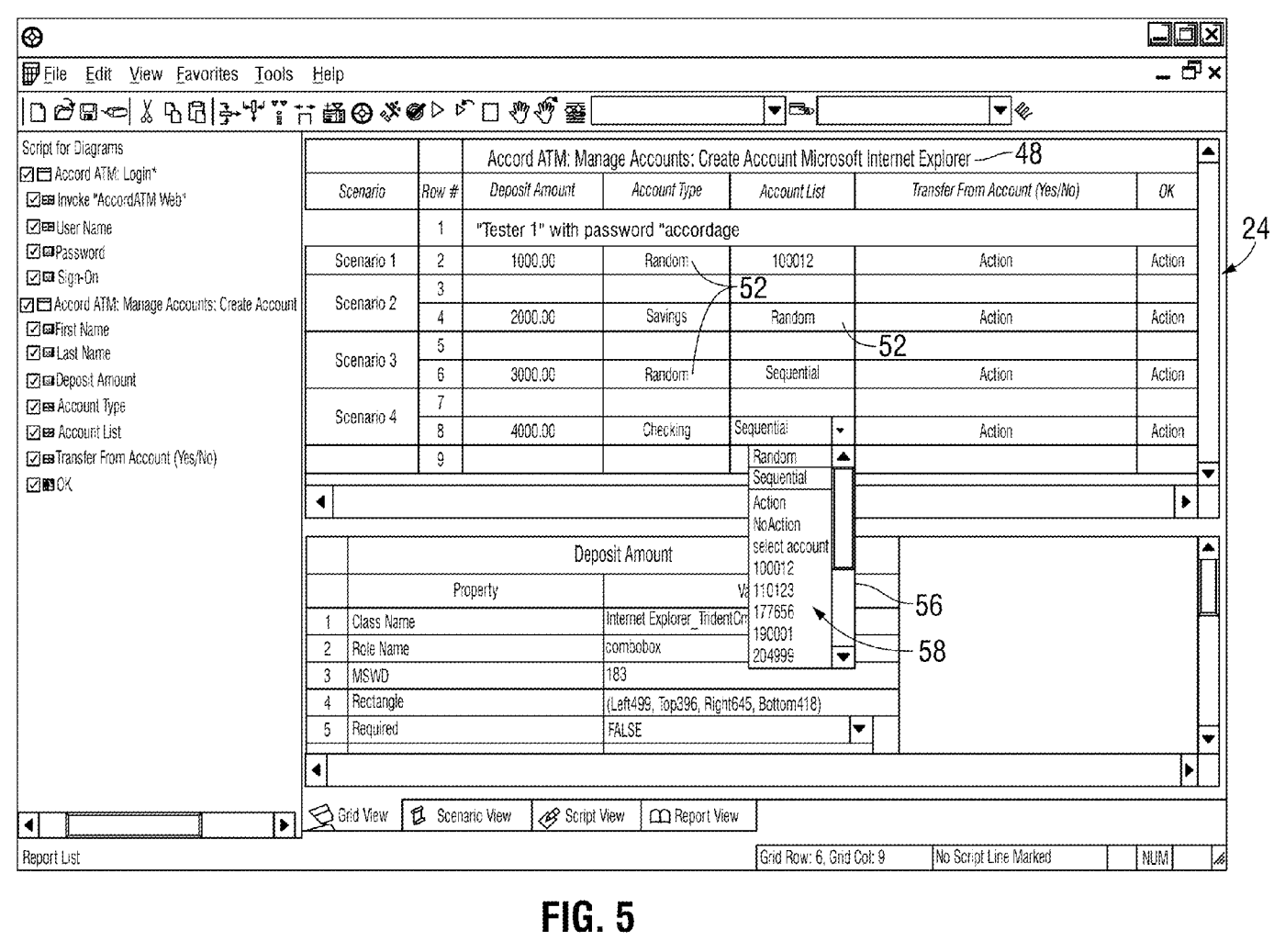

FIG. 5 shows the random operation of an object value 52 in the grid 24. Referring to FIGS. 5 and 3, each data object 38b has a type. As described above, the type indicates the input expected, such as mouse click, text entry, or others. A pull-down menu 56, or combo-box, allows selection from a predetermined set of values. A grid 24 object value 52 of "random" indicates that the test engine 30 will select randomly from the available predetermined values 58. This particular pulldown menu, or combo box, is employed in the example below with respect to FIGS. 6a-6f.

Figure 6A:
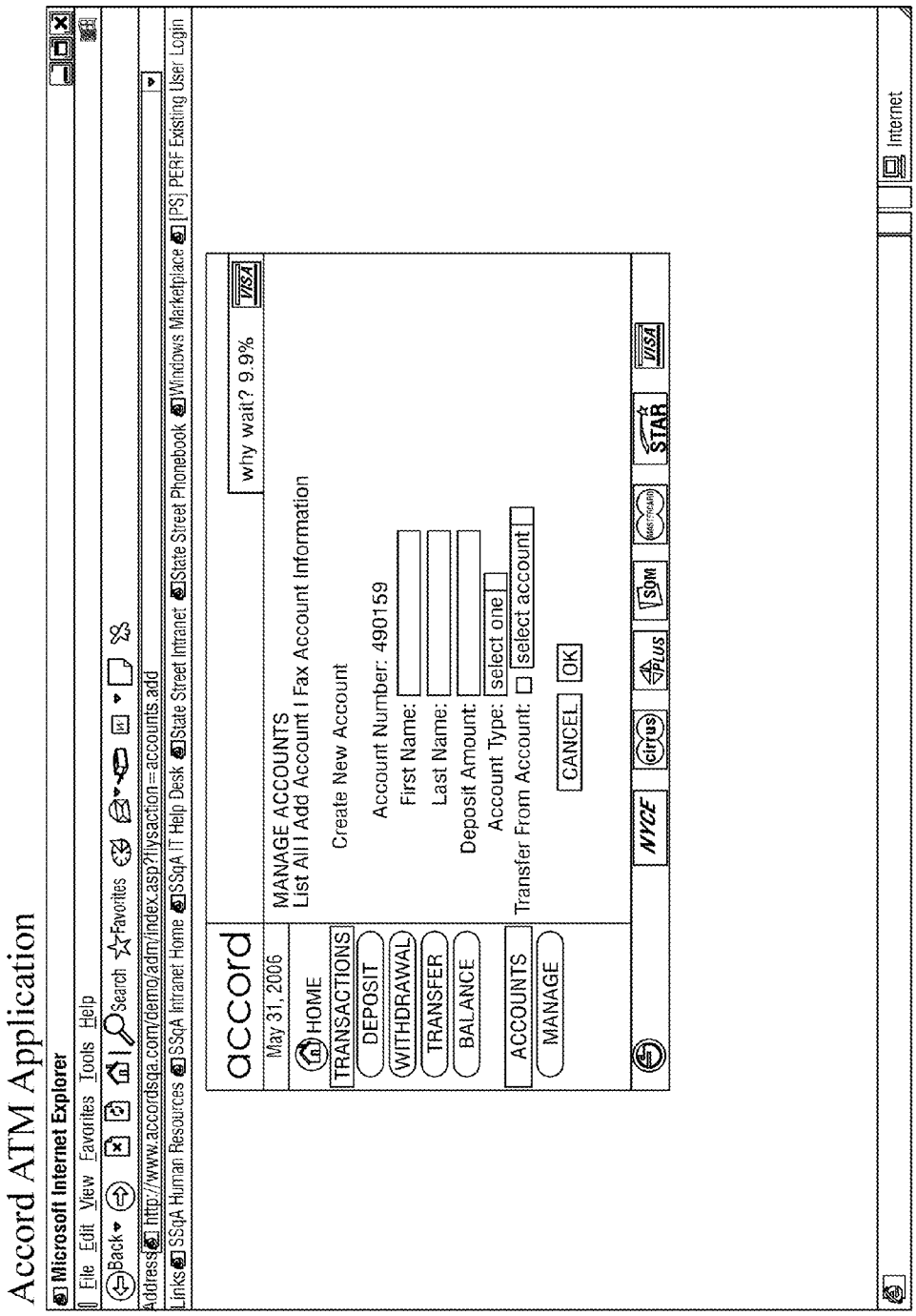

FIGS. 6a-6f are an example of a test of a software application under test (AUT). Referring to FIG. 6a and FIG. 2, a window 70 of a AUT is shown. The window 70 is titled "Manage Accounts" and contains the data objects "Deposit Amount" 60, "Account Type" 62, and "Transfer from Account" 64. Employing the learn module 20, the window and the data objects are learned to create the test thread tree 66 containing the data objects 66a, 66b, 66c, 66d and 66e and shown in the test thread tree window 40 in FIG. 6b.

In a particular embodiment, grid data entry may be automated by reading the grid entries from a database or other mass storage vehicle. The grid entries may therefore be populated by reading test case entries to populate the rows and columns in the grid. Further, object values in the grid may be propagated across each of the rows or columns by a single operation.

Figure 6B:
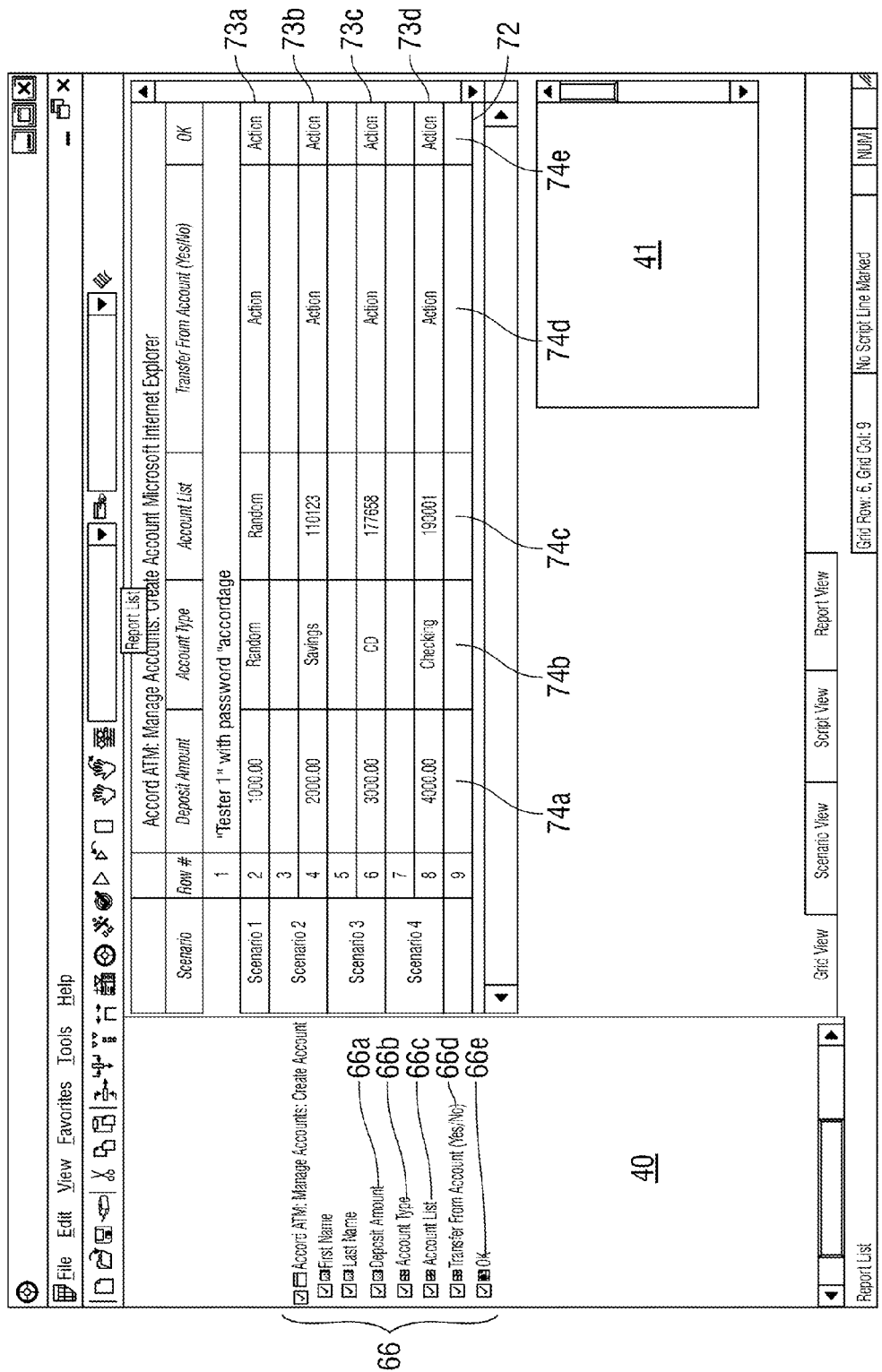

Referring to FIG. 6b, the test thread tree 66 is employed to generate the grid 72 in the display window 41. The grid 72 has grid column entries 74a, 74b, . . . 74e corresponding to the data objects 66a, 66b, . . . 66e, respectively. A plurality of test cases 73a-73d are generated, each containing object values 52 (FIG. 5) for the data objects 74a-74e. The number of test cases generated in the grid is selected by the test engineer, and may be derived during the learn function. Alternatively, the number of test cases may be derived automatically by traversing the code in the process. A variety of methods may be employed to determine the number of test cases for the process, and may include determination of the number of linearly independent paths through the process (cyclomatic complexity), all possible permutations of code, and paths sufficient to execute each line of code at least once. Other metrics may also be employed.

Figure 6D:

FIGS. 6c and 6d show the script 26 corresponding to the test tree 66. As described above, the script contains the instructions invoked by the test engine 30 for executing the test. Referring also to FIGS. 6c and 6d, an initial iteration loop is established by a code portion 76. The iteration loop initializes the test execution loop index to execute each test case 73a . . . 73n in the grid 72. An optional code portion 78 is provided for modifications and enhancements to the script such as statements from the statement window 54 (FIG. 4). The script then executes according to the loop index which specifies which test case from the grid 72 will be applied to the AUT. Code portion 80 is directed to the Deposit Amount 74a data object, and inserts the object value 52 from the column entry 74a corresponding to the test case 73a-73d, in the order according to the loop index. A null check is also made to ensure that an object value is defined for the particular test case. Code portion 82 allows insertion of statements specific to the Deposit Amount data object, and may even conditionally reference the loop index for test case specific actions, similarly to code portion 78.

Code portion 84 executes test cases for the Account Type 74b data object similar to code portion 80, and also provides a similar data object specific portion 86. Code portion 88 applies test cases to the Account List 74c data object, and employs the data object specific portion 90.

For each successive iteration, the script is executed for each case according to the loop index, populating data objects with the corresponding object values from the grid, and generates a result 36 discussed further below with respect to the report 28 (FIG. 2). For example, iteration 4 (loop=4) executes the code portions above with the object values from row entry 73d, in order from 74a, 74b and 74c.

FIGS. 6e-6f show the test results 36 corresponding to the grid 76 and the script in FIGS. 6c-6d. The test results are determined by comparing the expected responses from the test thread tree 22, the grid 24 and script 26 to the actual responses 34 sent by the AUT in response to the test engine 30. Referring to FIGS. 6e-6f and also to FIGS. 6a-6d, a test case result 101 indicates a Deposit Amount 74a entry of "1000", and a random entry for both Account Type 74b and Account List 74c. Referring to the test case result 101, the random selection "Savings" 101a was selected for the "Account Type" entry, and a random selection "100012" 101b was selected for the Account List entry. As both random selections are valid selections for the corresponding combo box data object, the result 101 indicates all pass entries 92 for each of the object values shown for test case 73a.

Test case iteration 2 (73b) provides an object value of "2000" for the Deposit Amount 74a. In this test case, object values of "Savings" 74b and "110123" 74c are specified, rather than the random function, for data objects 66b and 66c, respectively. As shown by test case result 102, object values "2000" 102a, "Savings" 102b and "110123" 102c indicate a test case result 92 of pass.

Test cases iterations 3 and 4, (103 and 104, respectively) execute similarly, and all indicate an overall result 92 of pass.

Referring to another example in FIG. 6f is a test case result 107. As shown in that test case result at 107a, "S30000" indicates a failure result because the item is not in the combo box list 56 (FIG. 5).

Figure 7:
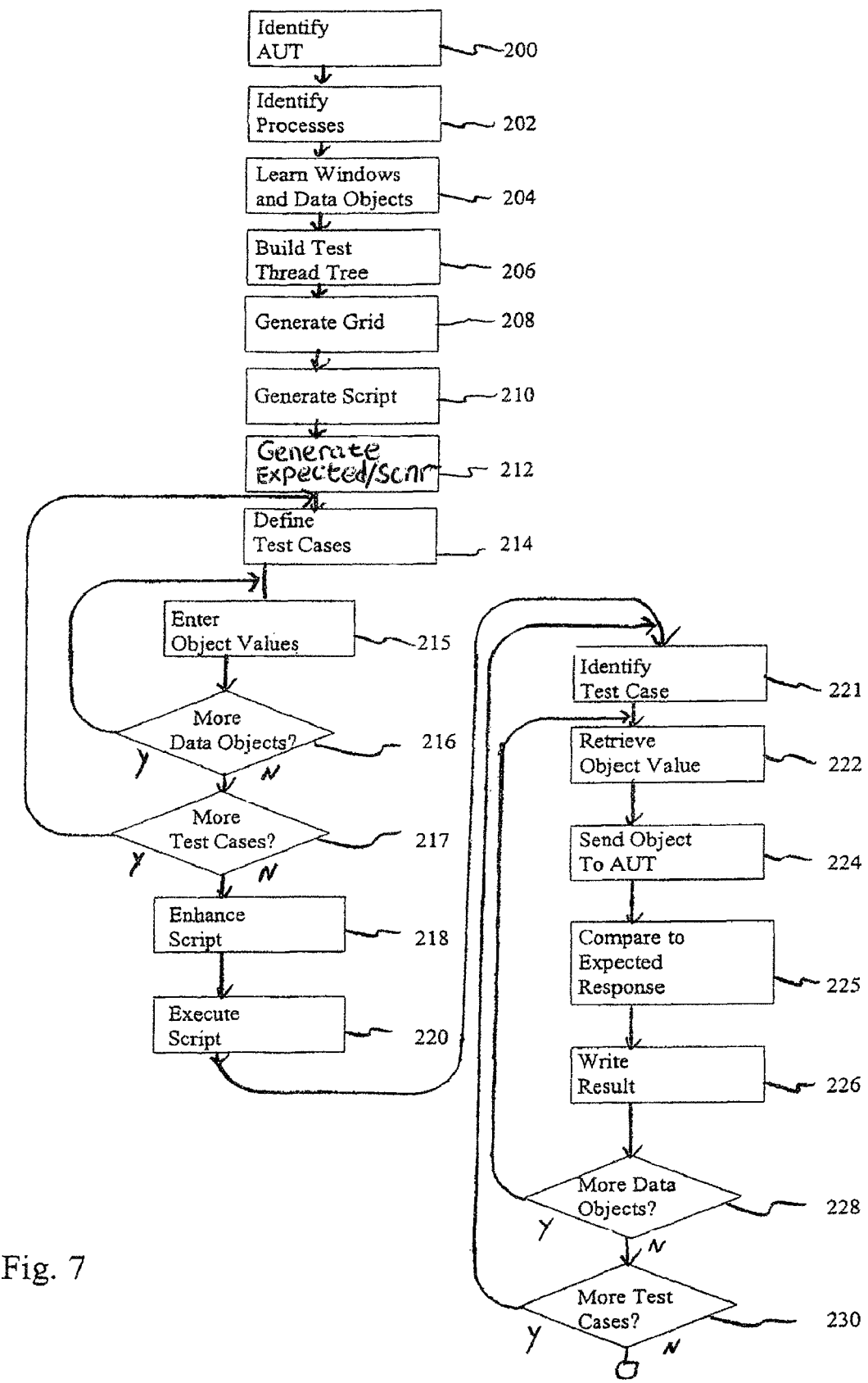
FIG. 7 is a flowchart of generation and execution of a script employed to test an AUT.

FIG. 7 is a flowchart of generation and execution of a script employed to test an AUT. Referring to FIGS. 7 and 2, an AUT 12 is identified, as depicted at step 200. Processes within the AUT 12 corresponding to threads to be tested are identified, as shown at step 202. Employing the learning module 20, the windows and data objects within the process are learned, as disclosed at step 204. A test thread tree 22 corresponding to the AUT 12 is built by the learn module 20, as depicted at step 206. The grid 24 representation is generated from test thread tree 22 by defining rows entries corresponding to test cases 44 and grid column entries 46 (FIG. 3) corresponding to the data objects 66a . . . 66n, as shown at step 208. The script 26 is then generated from the test thread tree 22 corresponding to the grid 24 and the data objects 66a . . . 66n therein, as depicted at step 210. The expected responses 28 are generated, for comparison to the test responses 34 from the AUT, as disclosed at step 212. Also at step 212 Scenario views are generated. Test cases are defined in the grid 24, as shown at step 214. For each test case, object values are entered in the grid 24 to correspond to data objects in the test thread tree 22, as shown at step 215. A check is performed to determine if there are any more data objects 66a ... 66n in this test case, as depicted at step 216. If not, a check is performed to determine if there are more test cases 44 for this test thread tree 22, as disclosed at step 217. Once the grid 24 is complete, the script 26 may be enhanced with statements or test case specific modifications, as shown at step 218. Note that the serial flow control shown here is exemplary for clarity, and that test case definition allows toggling between grid definition and test script enhancements and modifications.

Following completion of the grid object value 52 definition and the script modifications, the test cases 44 in the script 26 are ready to be executed by the test engine 30, as shown at step 220. The test case 44 is identified by the script 26 via the loop index, as depicted at step 221. For each data object 66a ... 66n in the test case, an object value 52 is retrieved from the grid to populate the data object 66a ... 66n, as depicted at step 222. The data object 66a ... 66n is sent to the AUT, as shown in step 224 and the response 34 compared to the expected test responses 28, as disclosed at step 225. The result of pass/fail and other parameters are written to the result 36, as depicted at step 226. A check is performed to determine if there are more data objects in the test case, as shown at step 228. If there are more data objects, control reverts to step 222, otherwise a check is performed to determine if there are more test cases in this grid, as depicted at step 230. If there are more test cases, then control reverts to step 221, otherwise the result 36 is complete and may be inspected for overall test status.

In the course of testing, it may be beneficial to customize certain test cases or perform special processing for a particular data object. Such extensions and modifications may be employed, as discussed above with respect to FIGS. 6d and 6e. Such modifications include breakpoints, which allow a script to be executed in segments. Breakpoints facilitate partial thread testing by pausing script execution at designated points in the script and returning control to the user. Checkpoints provide a mechanism to visually inspect a window for correct data objects and text. Another test enhancement provides for additional user code, either via external function libraries or the statements included in the statement window, described above. Such modifications provide for external function hooks into a test for predefined or ad-hoc generated enhancements. Other customization vehicles may be envisioned by those skilled in the art without departing from the scope of the invention as defined by the claims.

In embodiments of the present invention, the scripts 26 that are generated automatically are not just scripts that are hard-coded if one would use a record/playback method. The scripts 26 that the invention generates are fully "Parameterized" (use full Parameterization). The following further explains.

Currently the automated testing techniques used in the industry are to record hard-coded scripts and then modify and customize them to the changing application (AUT), object or windows that were changed. This process is extremely tedious which requires many hours of manual, user-intervention to modify hundreds of recorded or hand written scripts. In some prior art, the user writes a function to create a script but the data that is used in the functions is hard-coded (similar to the above recorded script).

What the invention "Parameterization" means is that the Generated scripts 26 (that are based on the Object Tree 22 and the Grid Visualization subsystem 24) are produced with the hard-coded data automatically replaced with respective string variables. This is not just for the hard coded data that appears in the edit fields, combo-boxes, etc. but also for all the Windows and Object names. This means that the user never has to go to the script 26 and edit it to replace the hard coded data and/or object names with string variables. This gives the script 26 much more flexibility as the user can add data and change names from the Object (Test Thread) Tree 22 and enter different data and different types of actions in the grid 24 into every object regardless of the object type.

Automated Script Parameterization Engine Process

As mentioned above, Second Generation Automated Testing tools of the prior art capture a sequence of hard-coded actions recorded by the user and place the actions in a hard-coded script. As the user requires a re-run of the recorded script in various iterations to achieve a Data-Driven Test structure, the user needs to reuse these recorded actions with different data values in the many iterations of the script. Furthermore, every hard-coded data element which was recorded in the script needs to be replaced manually by a parameter before it can be linked to a data source such as data files, data lists and/or spreadsheets.

Figure 8:
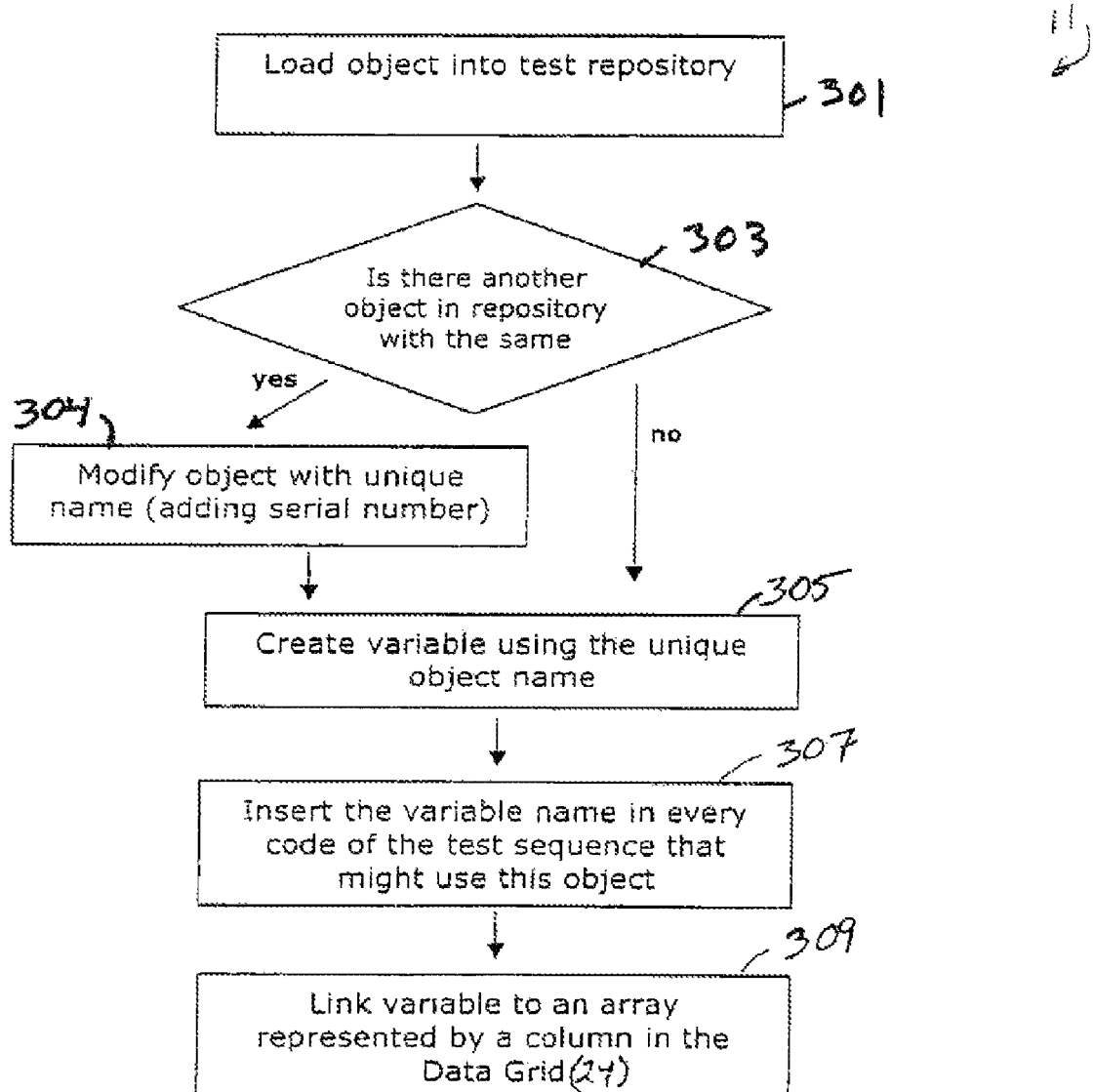
FIGS. 8 and 9 are flow charts of parameterization engine processes in embodiments of the present invention.

The above process of creating a Data-Driven Test structure is automatically generated within the present invention as part of the Learn 20 process and the Grid Visualization engine 24 previously described. A parameterization engine 11 accomplishes this as illustrated in FIG. 8 and further described below.

Once an object has been learned (using the Learn module 20 of FIG. 2), it is instantly assigned a variable in the generated test. In the Data Grid (Grid Visualization) 24, every column represents a variable of the object and the values that the user enters in the Grid column. These data values are used as the changing values of the variable when the test is executed. If the test is executed in multiple iterations, mapped data from files and/or the Data Grid 24 is used to achieve the Data-Driven tests. Thus, the overall sequence of the invention system 10 is (i) learn objects, (ii) enter test data into the Data Grid 24 for every object that participates in the test case, and (iii) run test actions according to the data that was assigned to objects in the Data Grid 24 and according to the number of iterations. In summary, the entire process of generating the Data-Driven tests structure is done automatically as the Data Grid (Grid Visualization) 24, the Script 26 and the Object (Test Thread) Tree 22 are generated simultaneously upon the learning of objects.

In one embodiment, the parameterization engine 11 utilizes the following data structures.

Grid_Columns—Multi-structure array that contains the unique name of the object, the name of the window it resides in and the type of the object. The information is kept in the same order of the Grid 24 Columns.

Grid_Data—The backend of the Data Grid 24 control, which is arranged as a two dimensional array, where each location is accessible by the specification of the intersection of certain row and column index.

Figure 9:
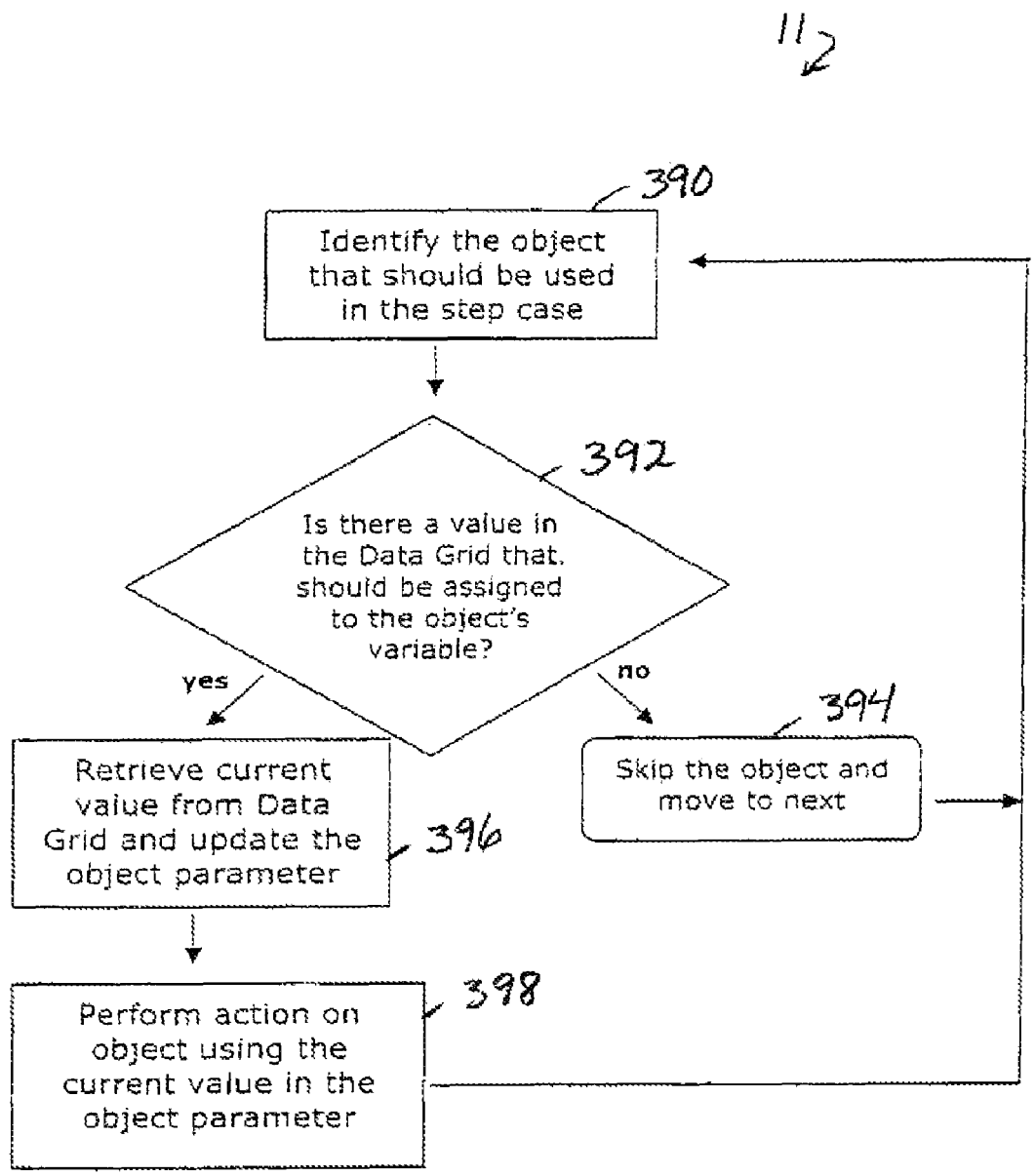

The parameterization engine 11 processes data objects of a subject AUT 12 as outlined in FIGS. 8 and 9. In step 301, parameterization engine 11 loads a subject object into a test repository. In step 303, engine 11 determines whether another object in the test repository has the same name as the subject object. If so, then step 304 modifies the object name for uniqueness. For example, step 304 adds a series number to the object name. Engine 11 continues processing at step 305 by creating a variable using the unique subject object name. Step 307 inserts the created variable name into the code (each pertinent location) of the test sequence that uses this object. Step 309 links the variable to an array represented by a column in the data grid 24 as previously discussed and illustrated.

During test execution, the object parameterization process of FIG. 9 is performed on each action that is specified in the test script generated by test engine 30. With reference to FIG.

9, given an action of a test script being executed, step 390 identifies the object that should be used. Next step 392 determines whether there is a value in the Data Grid 24 that should be assigned to the identified object's variable. If step 392 determines there is no such value, then processing loops back to step 390 to obtain (identify) another object and effectively skips 394 the current object. Otherwise, processing continues at step 396.

Step 396 retrieves the current value from Data Grid 24 and uses the retrieved value to update the object parameter. Step 398 performs the action on the object using the current value in the object parameter. After completing this action (step 398), processing repeats beginning at step 390 with the next action of the test script.

Global Object Change Manager™ (GCM) and Distributed Object Storage Model™ (DOSM)

Figure 10A:
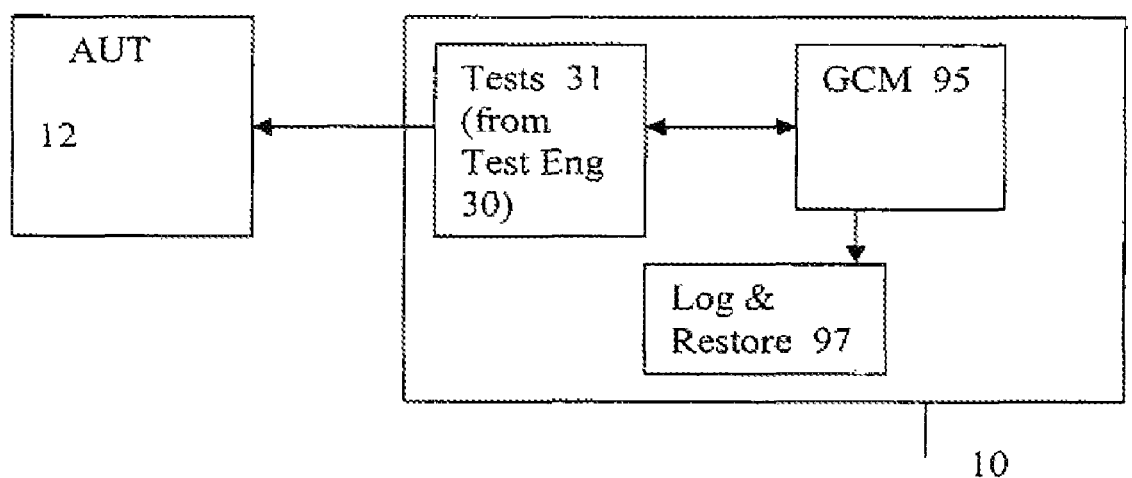
FIG. 10a is a block diagram of another embodiment of the present invention which includes a global change manager.
Figure 10B:
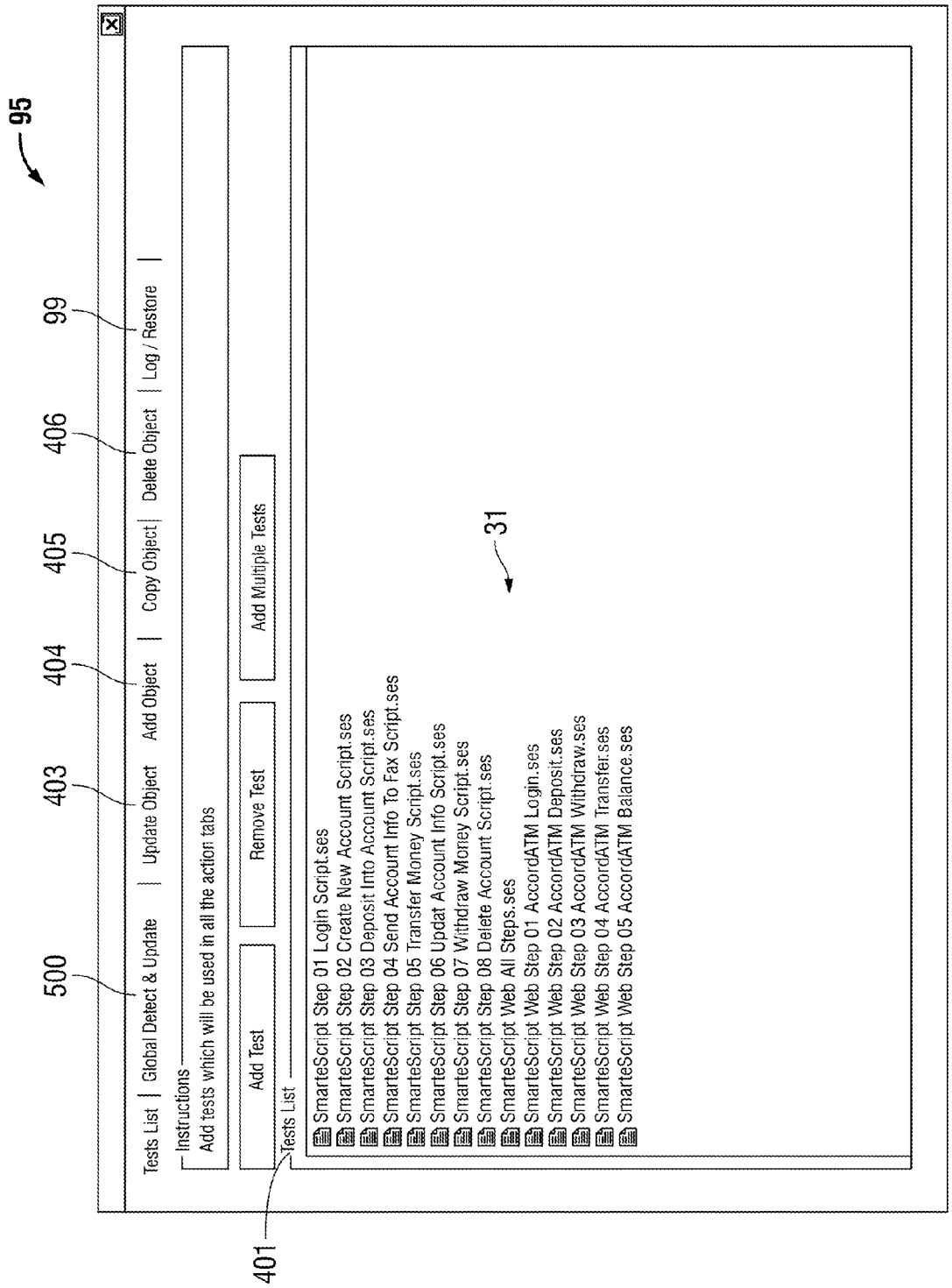
FIG. 10b is a schematic view of the global change manager user interface in an embodiment.

In some embodiments as illustrated in FIGS. 10a and 10b, a Global Object Change Manager (GCM) 95 provides the advantages of a Distributed Object Storage Model (DOSM) while eliminating single point of failure that exists in many other testing tools that use GUI Maps and Object Repositories. This enables the user to load multiple tests 31 from the system 10 into the GCM facility 95 and perform object maintenance and modifications across all existing scripts 26 and therefore, the complete test environment and system 10.

Illustrated in FIGS. 10a and 10b is an embodiment of the invention that employs the system 10 of FIG. 2 with additional elements/features discussed next. FIG. 10b further shows the Global Change Manager 95 feature and user interface therewith.

This embodiment of the present invention is designed based on the Distributed Object Storage Model (DOSM) concept which is achieved by storing objects within each test 31 versus maintaining a central object repository (single point of failure) that is accessible by all the tests 31 on the system 10. By using this technique the present invention prevents from user mistakes affecting all tests 31 on the system 10.

Figure 11:
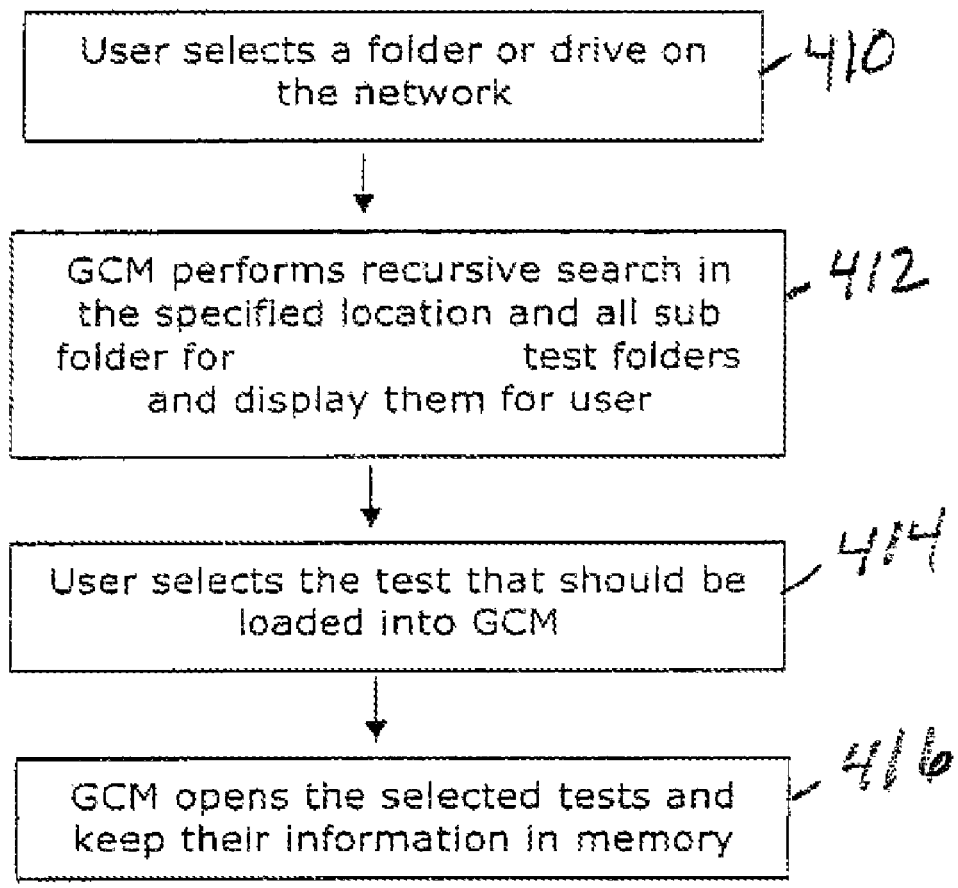
FIGS. 11-14 are flow charts of processes of the global change manager.

FIGS. 11-14 further detail the generation of the Global Object Change Manager 95. FIG. 11 illustrates the process of loading tests 31 into the GCM 95. At step 410, through a graphical user interface (GUI), the user is prompted to select a folder or drive location on the network. In response to the user's selection, at step 412 the GCM 95 performs a recursive search in the user specified location and all subfolders. The search looks for test folders, and the GCM 95 displays (through the GUI) the test folders found in the search. Step 414 prompts the user to select one or more of the displayed test indications (test folders) for loading into the GCM 95. In response to user selection, the GCM 95 opens 416 the selected tests 31 and copies the respective information into memory (GCM's 95 working memory). As a result, user selected tests 31 are loaded into GCM 95 and are indicated on Test Lists 401 in the GCM 95 user interface as illustrated in FIG. 10b.

Figure 12:
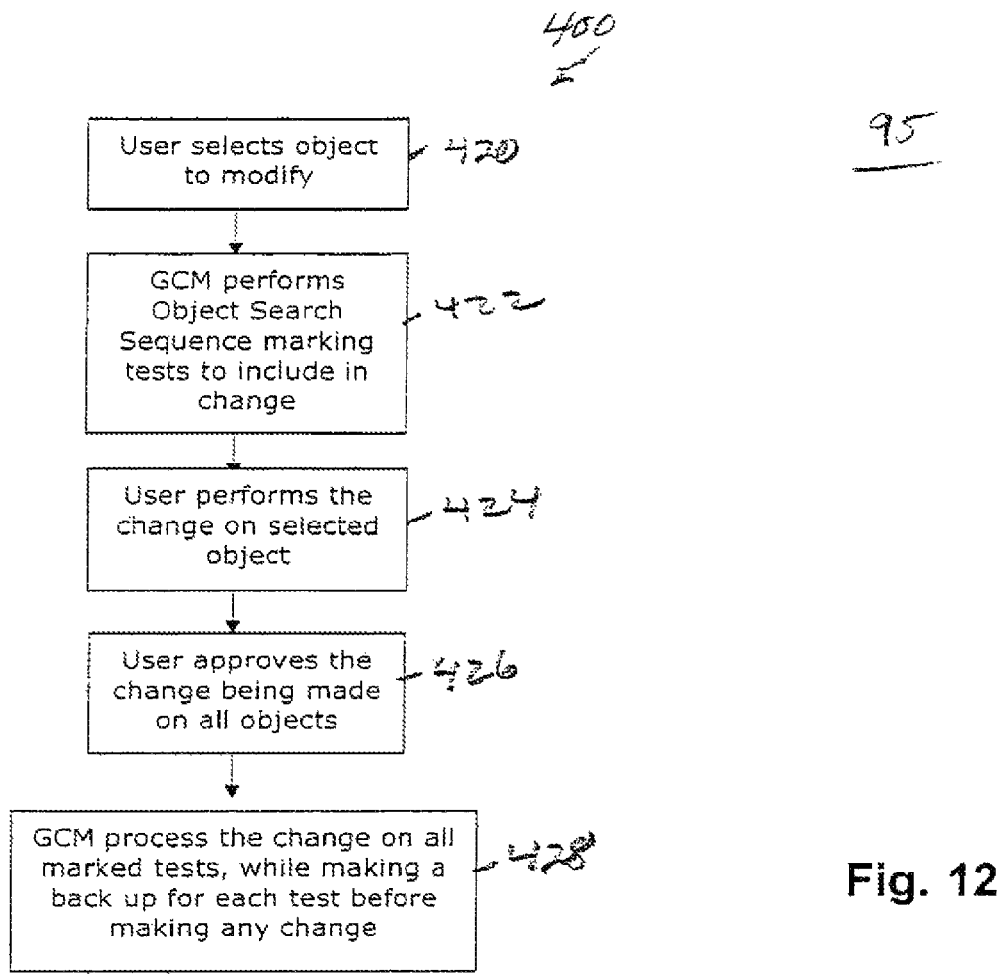

Proceeding with FIG. 12, the GCM 95 modifies objects of selected and loaded tests 31 as follows (and generally referenced as Modify Object Process 400). In step 420, GCM 95 prompts the user to select a test object to modify (by updating 403, adding 404, copying 405 or deleting 406 in FIG. 10b). In response to user selections, at step 422 the GCM 95 performs an object search sequence (detailed below in FIG. 13) marking tests 31 to include the user desired change. At step 424, GCM 95 prompts the user to perform the desired change on the selected subject object. GCM 95 at step 426 enables the user to approve the changes being made to the object and each relevant instance of the object as marked in step 422. Once the user indicates his approval, the GCM 95 (at step 428) processes the user's changes (above specified and approved) on all marked tests 31. Prior to instituting these changes, the GCM 95 makes a backup copy of each test 31 and stores the backup copies in a log and restore unit 97 (FIG. 10), described later.

Figure 13:
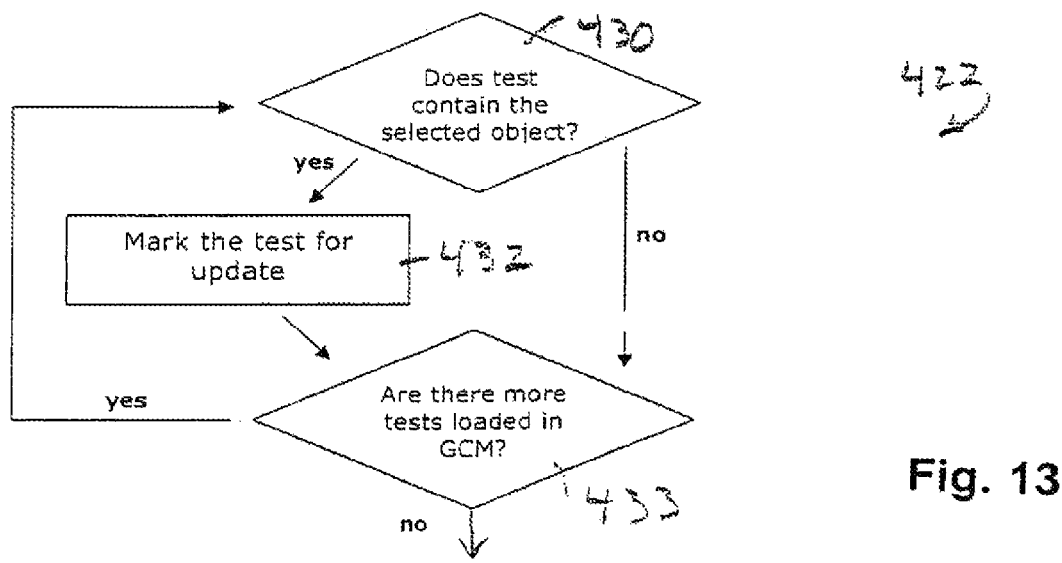

With regard to the object search sequence of step 422, the preferred process or routine is outlined in FIG. 13. For each test 31 loaded into GCM 95 (as described in FIG. 11), the search routine 422 determines (at step 430) whether the given test 31 contains the user selected object (from step 420). If the given test 31 does contain the subject object, then process 422 marks or flags the given test 31 for update (at step 432) and continues processing at step 433. If the given test 31 does not contain the subject object at step 430, processing continues at step 433.

At step 433, the routine 422 determines whether there are more tests 31 loaded in the GCM 95 that need to be considered. If so, the process repeats beginning at step 430. If not, the process ends and control is resumed at step 424 in FIG. 12.

The GCM 95 further includes detect and update processes 500. The Detect and Update processes examine selected windows in the application 12 and compare their objects to the objects that were learned in the test 31 in a previous version. If any of the objects change in the new version of the Application Under Test 12, the GCM 95 identifies the different attributes and displays them to the user. Based on this information, the user may decide to update the object (through the Update Object process 400 described above in FIGS. 12 and 13).

Figure 14:
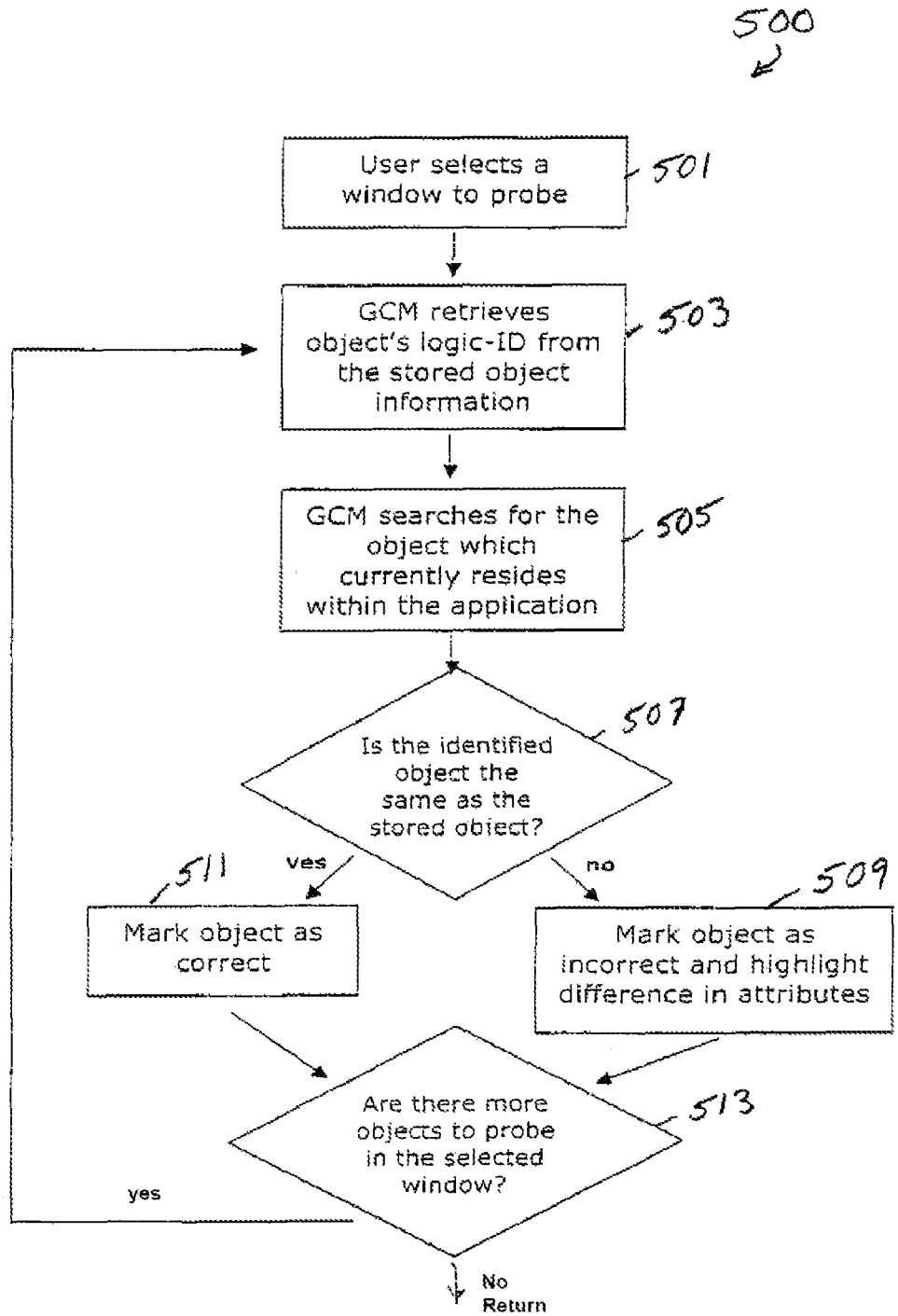

FIG. 14 illustrates the detect and update process 500 of one embodiment. At first step 501 of process 500, the user selects an application window to probe. The GCM 95 is responsive and retrieves (step 503) object's Logic-ID from the stored object information. Next (step 505) the GCM 95 searches for the object which currently resides within the subject application 12. Step 507 determines whether the identified object of step 505 is the same as the stored object of step 503. If the identified object is the same, then step 511 marks the identified object as correct. If the identified object is not the same, then step 509 marks the object as incorrect and highlights the difference in attributes. After steps 509 and 511, processing continues with step 513 which determines whether there are more objects to probe in the selected window. If there are more objects, then process 500 repeats beginning with step 503. Otherwise, the process 500 ends and control returns to main processing of GCM 95.

As mentioned above, GCM 95 keeps a backup of each test 31 before modifying it. These backups (as well as the changes they relate to) are recorded in the Log and Restore unit 97 (FIG. 10a). In order to restore a modified test 31, the user views a corresponding tab 99 (FIG. 10b) or directory listing of the contents of unit 97. The user selects to restore a change in a specific test 31. GCM 95 closes the current instance of the user selected test 31 and overwrites the selected test 31 with contents in the backup file that is related to the selected test change. The resulting test 31 is reloaded into GCM 95 and is made available for modifications using the above described processes 400, 500 of FIGS. 12-14.

Test Scenario/Data Generation Processor

Figure 16:
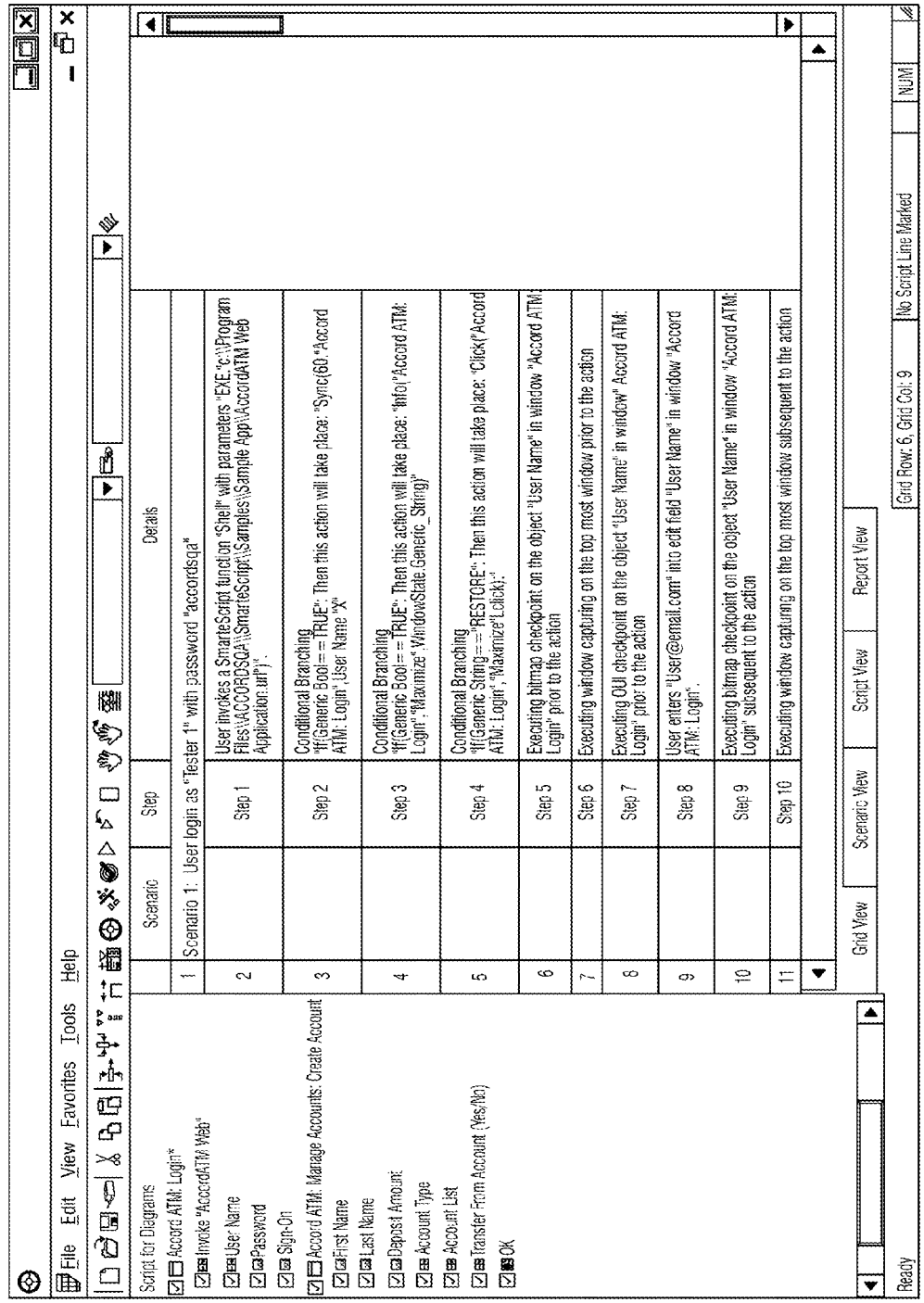
FIG. 16 is a schematic illustration of a Scenario view.

In some embodiments, test engine 30 (FIG. 2) includes a scenario view 29 feature described next. A user enters data into the Data Grid 24 cells as required in the test plan per object. Next, the user defines the scenario rows within the Data Grid 24. When the user defines a group of rows in the Data Grid 24 as a single Test Scenario (grouping several actions under the same test goal), test engine 30 or data generation engine 13 (shown in FIG. 2) translates the sequence of actions in the Data Grid 24 into a natural English language description. The outcome result of this translation is a step-by-step description (test case description) of the Scenario's actions. System 10 displays such Test Case Descriptions in a Scenario View 29 to the user. FIG. 16 is illustrative.

In one implementation, the step of defining Scenario rows in grid 24 includes:
The user highlights rows in the Data Grid 24 and selects the option to Define Scenario from a right-click menu;
The user enters a name of the Scenario (default is Scenario 1, Scenario 2, etc.);
The user enters color for the Scenario (default is white); and
Engine 30 stores the Scenario information in a data structure described below.
Scenario Data Structure
Name—The name of the Scenario
Color—The background color of the Scenario's rows in the Data Grid 24
Start—The first row of the Scenario in the Data Grid 24
End—The last row of the Scenario in the Data Grid 24.
Scenario_Repository—a Map data structure that stores all the Scenarios by unique name.
Processing and Generating a Test Scenario Data generation engine 13 of test engine 30 (FIG. 2) repeats the following process for each Scenario in the Scenario_Repository data structure every time the Scenario View 29 is called into display. The data generation engine processor 13 starts with the first row number of the Scenario (specified in the Start property of the Scenario) and continues until the last row number (specified in the End property) as illustrated in FIG. 15.

Figure 15:
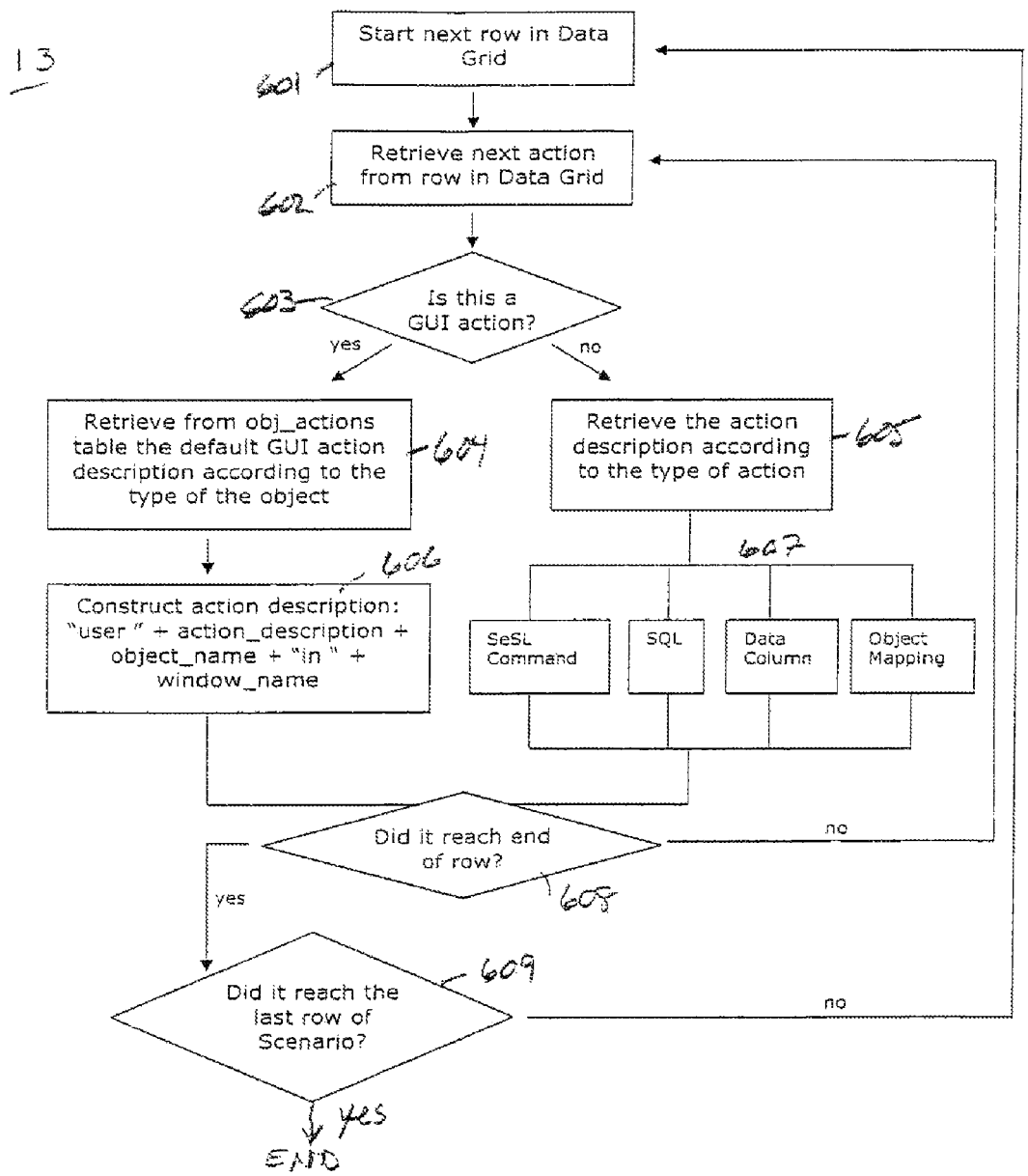
FIG. 15 is a flow chart of a data engine process for generating scenario views.

Referring to FIG. 15, step 601 obtains a pertinent row (test case) in the data grid 24. At step 602, the data engine 13 retrieves a subject action from the obtained row of step 601. At step 603, data engine 13 determines whether the retrieved action is a GUI action. If so, then step 604 retrieves from an obj_actions table of system 10 the default GUI action description based on type of the object corresponding to or associated with the retrieved action. Step 606 constructs an action description using name or indication of the user, the retrieved action description, the object name and the window name. After constructing the action description, data generation engine 13 may similarly process the next action of the subject row by looping from step 608 back to step 602.

If step 603 finds that the retrieved action is not a GUI action, then step 605 retrieves the action description according to type of the action. As shown for purposes of illustration and not limitation at step 607, action types may be SeSL Command, SQL, Data Column and Object Mapping actions. After retrieving one of these action descriptions accordingly, data generation engine 13 continues processing with the next action of the subject row at step 608 (followed by step 602 et seq.).

If the end of the row is reached at step 608, then step 609 continues processing with the next row, if any. The next row is similarly processed by the above described steps (step 609 looping back to step 601). Within each row the respective action descriptions are accumulated, as well as from row to row the action descriptions are accumulated to form the Test Case Description for the subject Scenario. If step 609 determines the last row of the Scenario has been reached and processed, then processing returns control to test engine 30 or system 10 generally to display the formed Test Case Description in a Scenario View 29.

Those skilled in the art should readily appreciate that the applications and programs for automated script processing as defined herein are deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software entity executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to particular embodiments thereof, it will be understood by those skilled in the art that various changes in form and details may be made therein without departing from the scope of the invention encompassed by the appended claims. Accordingly, the present invention is not intended to be limited except by the following claims.

The invention claimed is:

1. A method for automated software testing and validation, the method executed by one or more controllers, the method comprising:
    identifying a software application under test (AUT), the AUT including one or more processes having one or more windows including multiple objects and one or more data elements, the objects corresponding to respective visible graphical user interface (GUI) fields adapted to receive input;
    forming, for at least one of the one or more processes in the AUT, a test thread tree corresponding to each window, object and data element in the process;
    generating, from the test thread tree, a data structure enumerating a plurality of test cases indicative of the windows, data elements and objects in the AUT process, the data structure enabling different values for objects and data elements in the process and different types of actions for respective objects; and
    in response to learning objects in the AUT, automatically generating a parameterized script indicative of the plurality of test cases, the parameterized script including: (a) first string variables referring to respective ones of the windows in the AUT process and operable in the parameterized script to be modified by input data parameters to refer to different windows; (b) second string variables referring to respective ones of the objects in the AUT process and operable in the parameterized script to be modified by input data parameters to refer to different objects; and (c) third string variables referring to respective ones of the data elements and operable in the parameterized script to be modified by input data parameters to take on different data values associated with their respective data element; the parameterized script being operable to be executed by a test engine, wherein automatically generating a parameterized script further includes creating a variable name in the parameterized script for the string variables referring to the respective objects, and automatically linking the string variable to a set of variable values in the data structure.

2. The method of claim 1 wherein automatically generating the parameterized script is part of an automated process in which an entire test structure, including the test thread tree, the data structure, and the parameterized script, is created automatically in response to learning of objects.

3. The method of claim 2 wherein generating the data structure further comprises importing object values from an external database, the external database being operable to populate the data structure in an automated manner.

4. The method of claim 1 in which automatically generating the parameterized script is based on the test thread tree and the data structure.

5. The method of claim 1 wherein generating the data structure further comprises gathering object values, each of the object values indicative of a particular process window, data element or object for a particular test case.

6. The method of claim 1 wherein generating the data structure further comprises propagating an object value across multiple data structure entries from a particular object value.

7. The method of claim 1 further comprising using the test thread tree, modifying attributes of references to at least one of the AUT process objects and the window across multiple scripts in an automated manner.

8. The method of claim 1 further comprising modifying attributes of references to at least one of the AUT process objects and the windows across multiple scripts in an automated manner by:
   receiving an indication to select a plurality of tests on a system;
   prompting a user to select a test object to modify;
   receiving a user selection of a test object to modify;
   receiving a desired change to make in the selection;
   performing an object search sequence in the selected plurality of tests to locate all objects relevant to the modification in the selected plurality of tests; and
   implementing the desired change in the relevant objects.

9. The method of claim 1 further comprising generating, from the test thread tree and the data structure, a test description of a scenario of one or more test cases, the test description comprising a step-by-step natural language description of actions in each test case in the scenario.

10. The method of claim 1 wherein the AUT further comprises a graphical user interface (GUI) and forming the test thread tree further comprises traversing a window sequence of a plurality of the windows of the GUI.

11. A computer system for automated software testing and validation, the computer system including one or more hardware controllers programmed with executable software, the computer system for interacting with a workpiece software application under test (AUT), the AUT including one or more processes having one or more windows including multiple objects and one or more data elements, the objects corresponding to respective visible graphical user interface (GUI) fields adapted to receive input, the computer system including:
   a learning module adapted for learning characteristics of the AUT, the learning module further operable for forming, for at least one of the one or more processes in the AUT, a test thread tree corresponding to each window, object and data element in the AUT process;
   a data structure, generated from the test thread tree, the data structure enumerating a plurality of test cases indicative of the windows, data elements and objects in the AUT process, the data structure enabling different values for objects and data elements in the process and different types of actions for respective objects; and
   a test engine operable to automatically generate a parameterized script indicative of the plurality of test cases, the parameterized script including: (a) first string variables referring to respective windows in the AUT process, and operable in the parameterized script to be modified by input data parameters to refer to different windows; (b) second string variables referring to respective ones of the objects in the AUT process and operable in the parameterized script to be modified by input data parameters to refer to different objects; and (c) third string variables referring to respective ones of the data elements and operable in the parameterized script to be modified by input data parameters to take on different data values associated with their respective data element; the parameterized script being operable to be executed by a test engine, the test engine further operable to create a variable name in the parameterized script for the string variables referring to the respective objects, and automatically link the string variable to a set of variable values in the data structure.

12. The computer system of claim 11 wherein the computer system is further operable to conduct an automated process in which an entire test structure, including the test thread tree, the data structure, and the parameterized script, is created automatically in response to learning of objects.

13. The computer system of claim 11 further comprising a global change manager module operable for modifying attributes of references to at least one of the AUT process objects and the windows across multiple scripts in an automated manner by:
   receiving an indication to select a plurality of tests on a system;
   prompting a user to select a test object to modify;
   receiving a user selection of a test object to modify;
   receiving a desired change to make in the selection;
   performing an object search sequence in the selected plurality of tests to locate all objects relevant to the modification in the selected plurality of tests; and
   implementing the desired change in the relevant objects.

14. The computer system of claim 11 further comprising generating, from the test thread tree and the data structure, a test description of a scenario of one or more test cases, the test description comprising a step-by-step natural language description of actions in each test case in the scenario.

15. A method for automated software testing and validation, the method executed by one or more controllers, the method comprising:
   identifying a software application under test (AUT), the AUT including one or more processes having one or more windows including multiple objects, the objects corresponding to respective visible graphical user interface (GUI) fields in the AUT adapted to receive input, the one or more processes further including one or more data elements;
   forming, for at least one of the one or more processes in the AUT, a test thread tree corresponding to each window, object and data element in the process;
   generating a plurality of test cases for the AUT process;
   generating a parameterized script indicative of the plurality of test cases, the parameterized script enabling different values for data elements in the process and different types of actions for respective objects; and
   in response to receiving an input from a user defining a designated group of test cases as a test scenario, automatically generating a test description of a scenario of one or more of the test cases, the test description comprising a step-by-step natural language description of actions in each test case in the scenario, and displaying the test description in a scenario view window separate from the parameterized script, wherein automatically generating the test description is repeated in response to a user calling a scenario view onto a display.

16. The method of claim 15 wherein generating the test description further comprises retrieving an actions table containing GUI action descriptions and constructing at least part of the step-by-step natural language description by combining action descriptions from the actions table with object names used in the test cases.

17. The method of claim 16 wherein combining action descriptions from the actions table with object names further includes combining window names used in the test cases.

18. The method of claim 15 wherein generating the test description further comprises determining a type of action taken in the test case and retrieving action descriptions to describe the test case according to the determined type of action.

19. The method of claim 15 further comprising generating, from the test thread tree, a data structure enumerating a plurality of test cases indicative of the windows, data elements and objects in the AUT process, the data structure enabling different values for objects and data elements in the process and different types of actions for respective objects; and wherein automatically generating the test description comprises generating a test description for each of multiple rows of the data structure relevant to the scenario.

20. The method of claim 19 wherein generating a parameterized script further includes creating a variable name in the parameterized script for string variables referring to the respective objects, and automatically linking the string variable to an array represented by a column in the data structure.

* * * * *